(12) United States Patent
Muharemovic et al.

(10) Patent No.: US 8,068,466 B2
(45) Date of Patent: Nov. 29, 2011

(54) TRANSMISSION OF MULTIPLE INFORMATION ELEMENTS IN MULTIPLE CHANNELS

(75) Inventors: Tarik Muharemovic, Dallas, TX (US); Zukang Shen, Richardson, TX (US); Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 754 days.

(21) Appl. No.: 12/173,200

(22) Filed: Jul. 15, 2008

(65) Prior Publication Data
US 2009/0022110 A1  Jan. 22, 2009

Related U.S. Application Data

(60) Provisional application No. 60/951,020, filed on Jul. 20, 2007, provisional application No. 60/954,353, filed on Aug. 7, 2007.

(51) Int. Cl.
*H04J 3/00* (2006.01)
*H04J 3/16* (2006.01)
*H04B 7/216* (2006.01)

(52) U.S. Cl. ......... 370/335; 370/342; 370/466; 370/468
(58) Field of Classification Search .................... None
See application file for complete search history.

(56) References Cited

U.S. PATENT DOCUMENTS

| | | | |
|---|---|---|---|
| 5,206,933 A | | 4/1993 | Farrell et al. |
| 7,013,143 B2 * | | 3/2006 | Love et al. ................... 455/450 |
| 7,876,774 B2 * | | 1/2011 | Zangi ............................ 370/461 |
| 7,974,253 B2 * | | 7/2011 | Laroia et al. .................. 370/342 |
| 2001/0024956 A1 | | 9/2001 | You et al. |
| 2008/0273513 A1 * | | 11/2008 | Montojo et al. .............. 370/342 |

FOREIGN PATENT DOCUMENTS

| JP | 06069859 A | 3/1994 |
|---|---|---|
| KR | 2001-0011327 A | 2/2001 |

OTHER PUBLICATIONS

3GPP, "3rd Generation Partnership Project: Technical Specification Group Radio Access Network; Physical Channels and Modulation", 3GPP TS 36.211 V1.0.0, Mar. 2007, pp. 1-30.

* cited by examiner

*Primary Examiner* — Nittaya Juntima
(74) *Attorney, Agent, or Firm* — Robert D. Marshall, Jr.; W. James Brady; Frederick J. Telecky, Jr.

(57) ABSTRACT

A transmission of information from a secondary to a primary node occurs in a plurality of N logical time durations. The transmission from the secondary to primary node in a wireless network is performed by first receiving an allocation of M>1 reverse link channels for transmission of N>0 information elements. N information elements are produced. A group of K (possibly only one) reverse link channels is selected from the M allocated reverse link channels, using at least one of the N produced information elements, wherein the group of K reverse link channels comprises at least one channel, such that 0<K<M. A signal is produced using the produced information elements and the produced signal is transmitted on the selected group of K reverse link channels. Embodiments of the invention apply to transmission of ACKNAK and SRI.

25 Claims, 17 Drawing Sheets

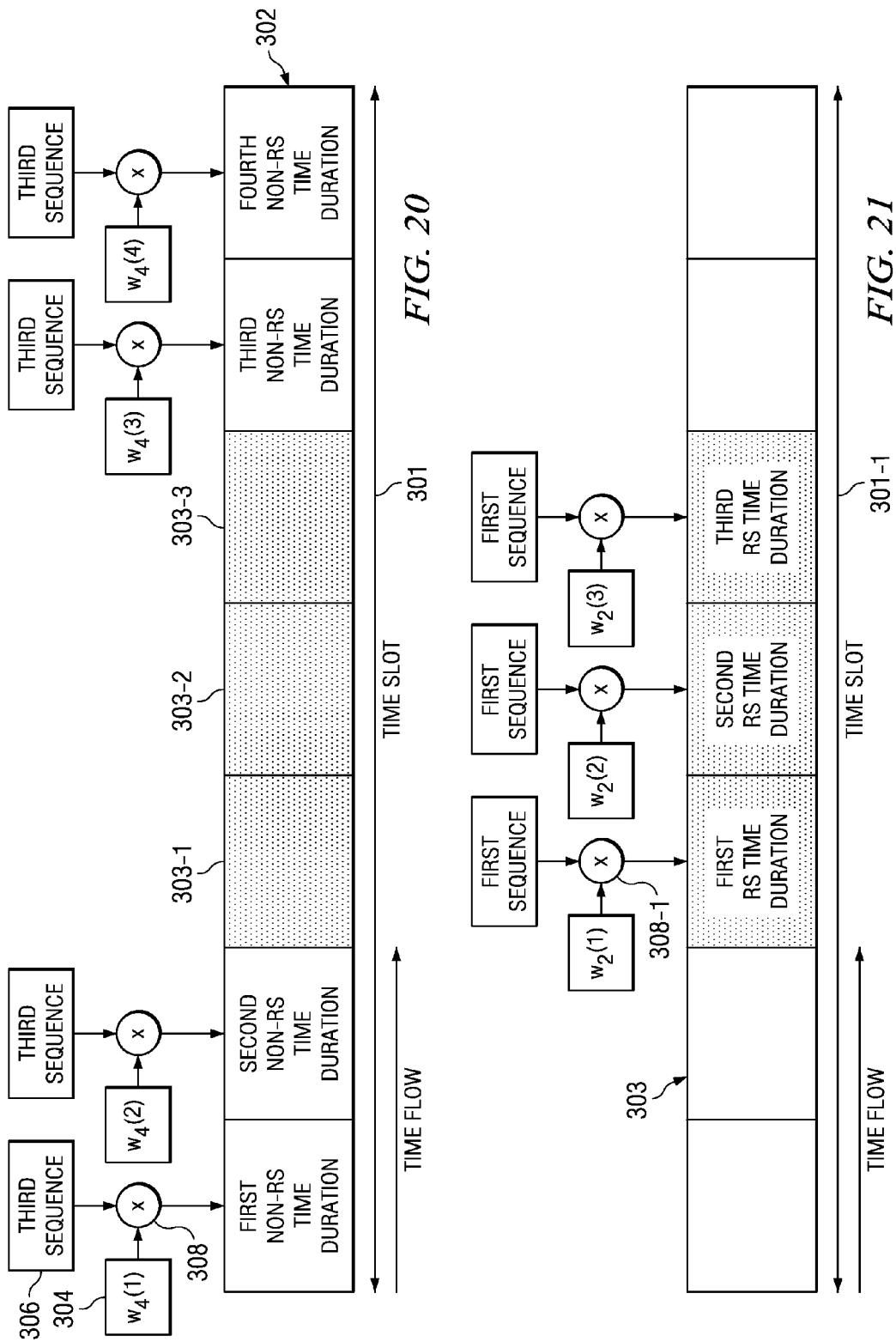

TRANSMISSION OF MULTIPLE INFORMATION ELEMENTS IN MULTIPLE CHANNELS

CLAIM OF PRIORITY UNDER 35 U.S.C. 119(e)

The present application claims priority to and incorporates by reference U.S. Provisional Application No. 60/951,020, filed Jul. 20, 2007, entitled "Transmission of Information When Multiple Physical Cannels are Assigned to the Transmitter." The present application also claims priority to and incorporates by reference U.S. Provisional Application No. 60/954,353, filed Aug. 7, 2007, entitled "Transmission of Multiple Information Bits in Multiple Channels."

FIELD OF THE INVENTION

This invention generally relates to wireless communications. Embodiments of the invention can be applied to cellular communications, and in particular to use multiple channels in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Uplink is sometimes also denoted as reverse link. Downlink is sometimes denoted as forward link. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) often requires at least a bit of ACK/NACK information transmitted in the uplink, indicating successful or failed circular redundancy check(s) (CRC). In other cases HARQ can require 3-state (or more than 3-state) signaling. Moreover, a one bit scheduling request indicator (SRI) can be transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACK-NAK or just simply ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH should be designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (Release 8)."

Resources can be allocated to a UE using physical downlink control channel (PDCCH). Alternatively, resources can be allocated to the UE using radio resource control (RRC) signaling. In this application, term "resource" and term "channel" can be used as synonyms. In general, a resource can be identified using time duration, spectrum occupancy, a signature code, antenna, MIMO pre-coder or a combination thereof. A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings:

FIGS. 20-25 are diagrams illustrating various embodiments of producing a signal for transmission on K selected channel(s);

DETAILED DESCRIPTION OF EMBODIMENTS OF THE INVENTION

Figure 1:
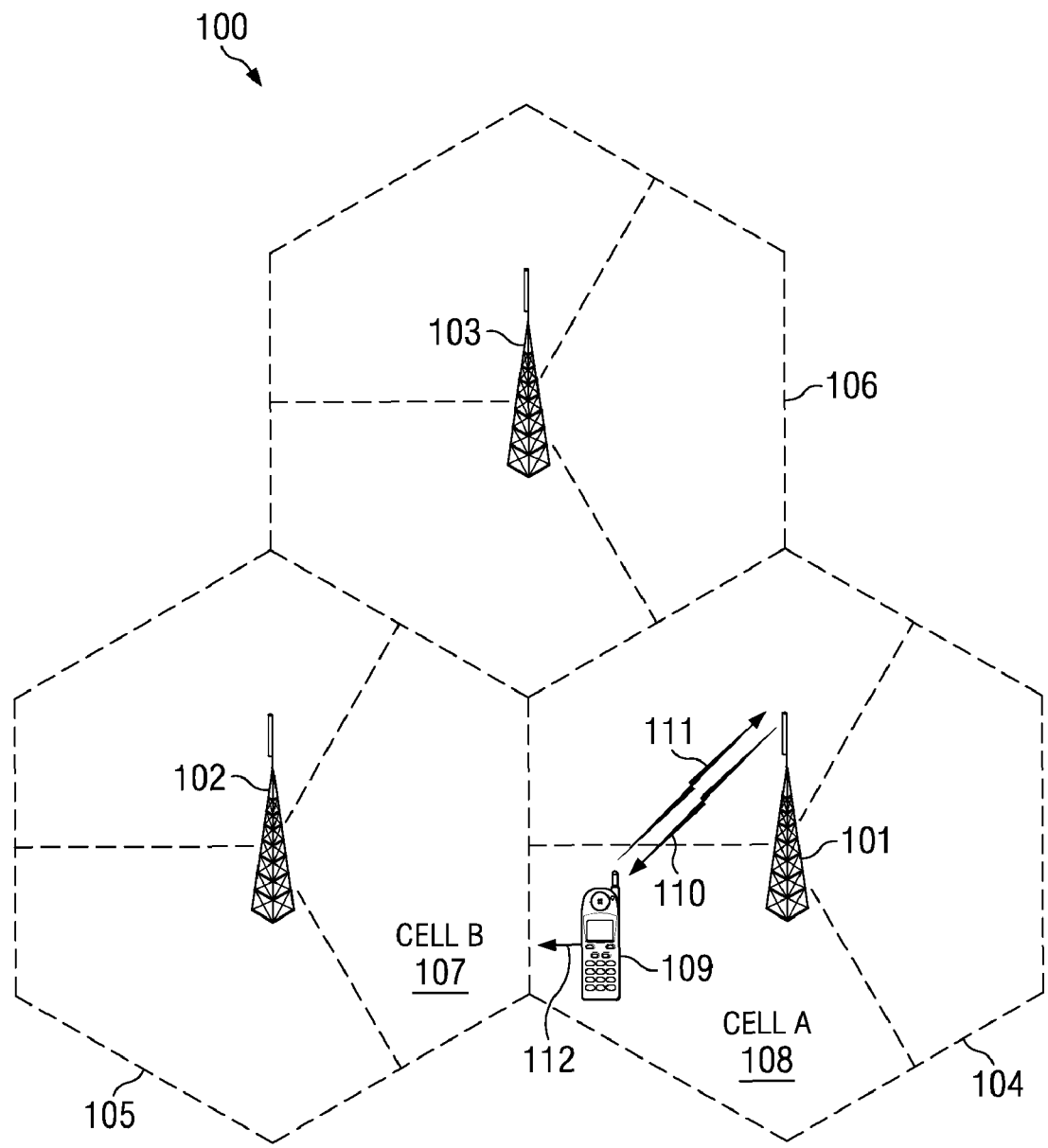
FIG. 1 is a pictorial of an illustrative wireless communications network that uses the present invention.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. If/when UE 109 moves out of Cell A 108, and into Cell B 107, UE 109 may be handed over to base station 102. A UE in a cell may be stationary such as within a home or office, or may be moving while a user is walking or riding in a vehicle. UE 109 moves within cell 108 with a velocity 112 relative to base station 102.

Figure 2:
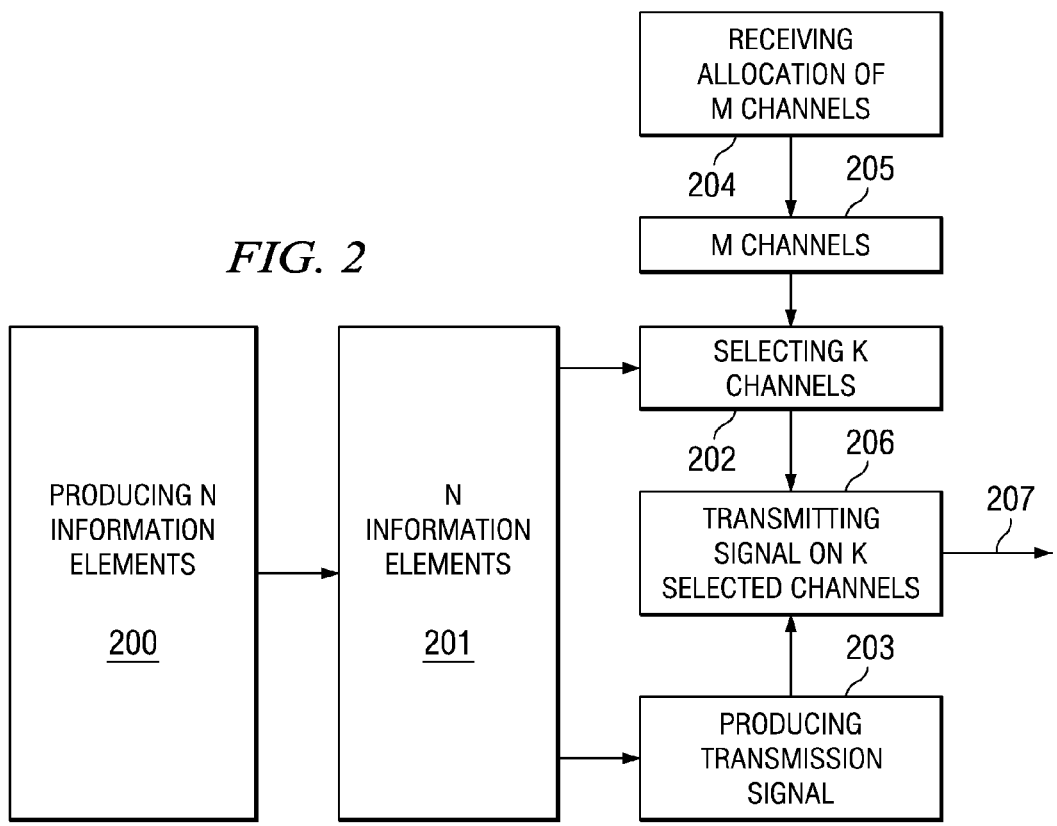
FIG. 2 is a general block diagram of a transceiver in accordance with an embodiment of the invention for transmission of multiple (N) information elements.

FIG. 2 is a block diagram of an illustrative transceiver in accordance with an embodiment of the invention. Elements of the transceiver may be implemented as components in a fixed or programmable processor by executing instructions stored in memory. An allocation of M channels 205 is received via a functional unit 204. N information elements 201 are produced using functional unit 200. In some embodiments of the invention, an information element is two-state (binary) quantity (i.e. a bit). In other embodiments, an information element can be a quantity which assumes more than two states. Different information elements need not necessarily have the same number of states. Using the produced information elements 201 and the functional unit 202, a selection of K channels is performed, from the set of M allocated channels. In some embodiments of the invention K=1; while in other embodiments K can be larger than one. Using the produced information elements 201 and the functional unit 203, a transmission signal 207 is produced. Transmission signal 207 is transmitted across the selected K channels using a functional unit 206.

Figure 3:
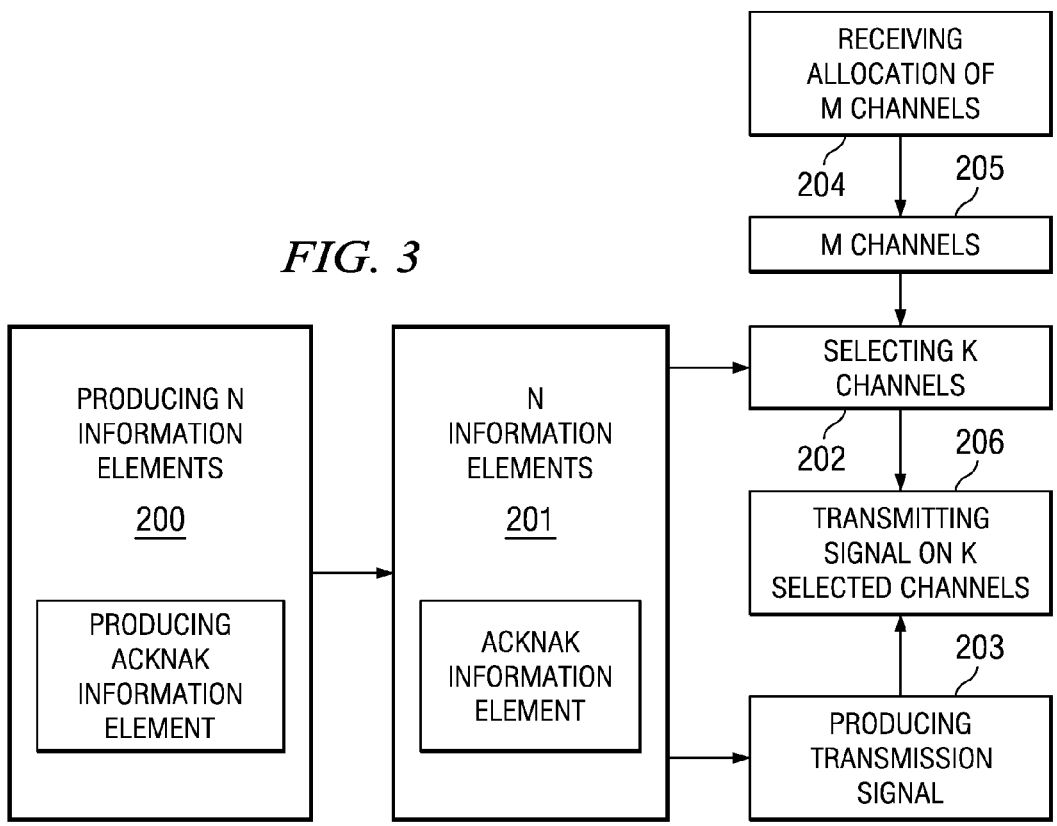
FIG. 3 is a block diagram of the transceiver of FIG. 2 for the case where at least an ACKNAK information element is produced and transmitted.

FIG. 3 shows a block diagram in accordance with an embodiment of the invention. In FIG. 3, at least one (produced and transmitted) information element is an ACKNAK information element. ACKNAK information element is transmitted in support of hybrid automatic repeat request (HARQ). In some embodiments of the invention, said ACKNAK information element is produced by receiving a data packet, followed by performing error detection or error checking on the received data packet. In some embodiments of the invention, the error checking is achieved using a circular redundancy check (CRC), where the CRC can "pass" or "fail." If a CRC "fails" an error detection is declared, whereas if the CRC "passes" a transmission success is declared. If an error is detected, a NAK is transmitted (specific realization of ACKNAK information element), whereas if no error is detected, an ACK is transmitted (another specific realization of ACKNAK information element). FIG. 3 is a specific embodiment of FIG. 2, where ACKNAK information element is a part of the N information elements.

Figure 4:
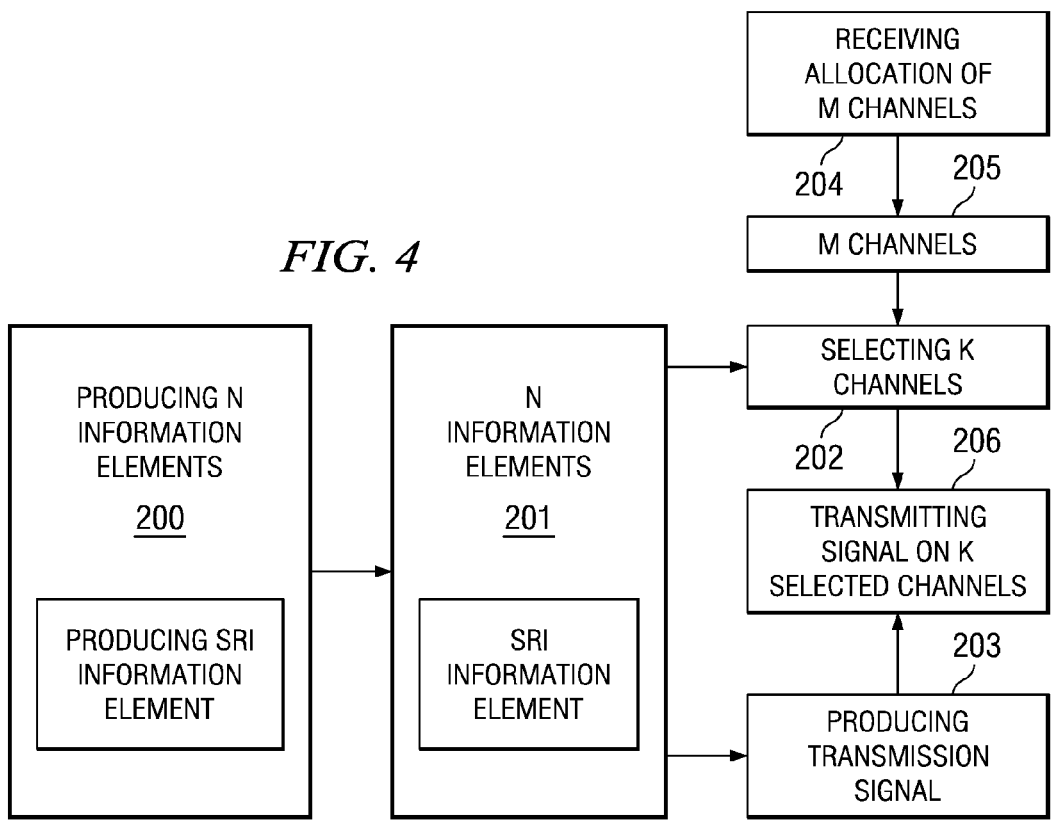
FIG. 4 is a block diagram of the transceiver of FIG. 2 for the case where at least a scheduling request indicator (SRI) information element is produced and transmitted.

FIG. 4 is a specific embodiment of FIG. 2, where an SRI information element is a part of the N information elements. SRI is a request to be scheduled, produced by the UE, and transmitted to the NodeB. In some embodiments of the invention, SRI can be a positive or a negative SRI (two-state). In other embodiments of the invention, an SRI is permitted to have more than two states. After reception of the SRI, the NodeB can decide whether or not to schedule the UE. In some embodiments of the invention, UE can subsequently be scheduled on PUSCH. In some embodiments of the invention, a positive SRI is produced when a UE produces new data to be transmitted. In other embodiments of the invention, a positive SRI can be triggered by different events, such as buffer status updates, unavailability of PUSCH allocation for an extended period of time, or any other pre-defined event.

Figure 5:
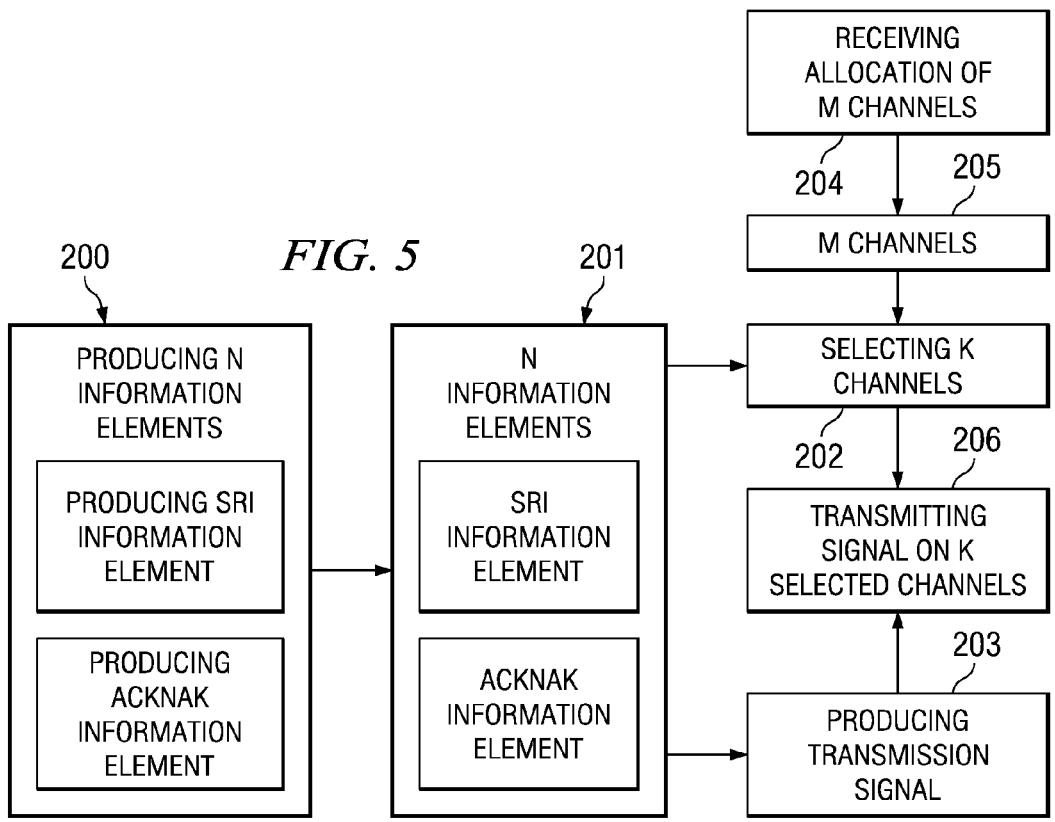
FIG. 5 is a block diagram of the transceiver of FIG. 2 for the case where at least both SRI and ACKNAK information elements are produced and transmitted.
Figure 6:
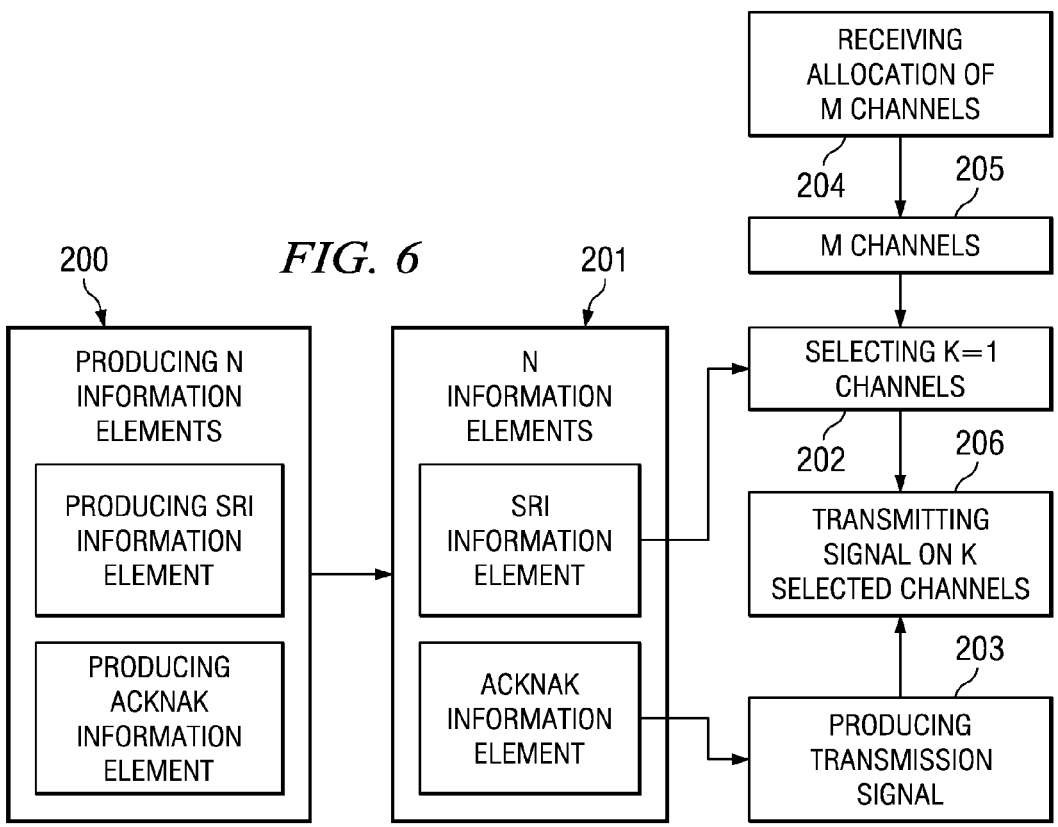
FIGS. 6 and 7 are more detailed block diagrams of the transceiver of FIG. 5 illustrating selection of K=1 channels for transmission.

FIG. 5 is a specific embodiment of FIG. 2, where both SRI and ACKNAK information elements are transmitted simultaneously. FIG. 5 is general in a sense that both ACKNAK and SRI information elements can be used for channel selection and for production of transmission signal. FIG. 6 is more specific than FIG. 5. In FIG. 6, only one channel can be selected (K=1). Furthermore, in FIG. 6, the SRI information element is used for channel selection, whereas the ACKNAK information element is used for producing the transmission signal. In some embodiments of the invention, N information elements comprise exactly two information elements: the ACKNAK information element and the SRI information element. In other embodiments of the invention (FIG. 7), the ACKNAK information element is used for channel selection whereas SRI information element is used for production of transmission signal.

Figure 8:
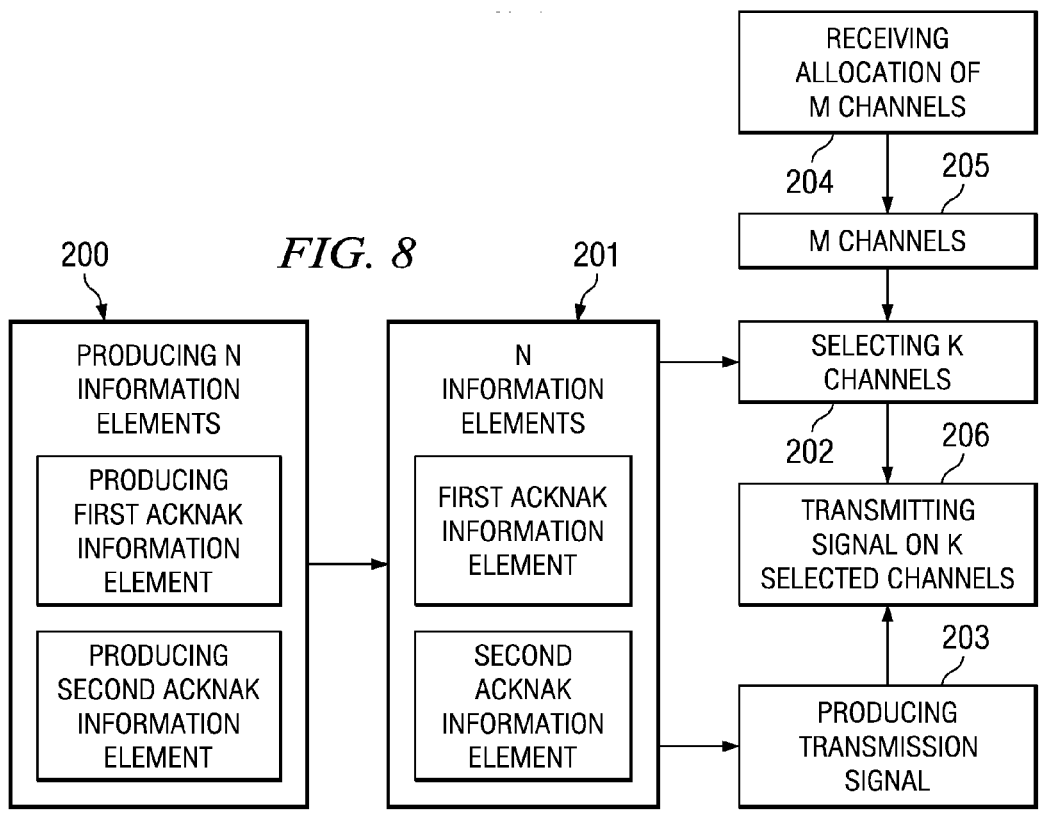
FIG. 8 is block diagram of the transceiver of FIG. 3 for the case where at least two ACKNAK information elements are produced and transmitted.

FIG. 8 shows that two ACKNAK information elements can be transmitted simultaneously using the transceiver diagram of FIG. 2. In some embodiments of the invention, a first ACKNAK information element corresponds to a first HARQ process whereas the second ACKNAK information element corresponds to a second HARQ process.

Figure 9:
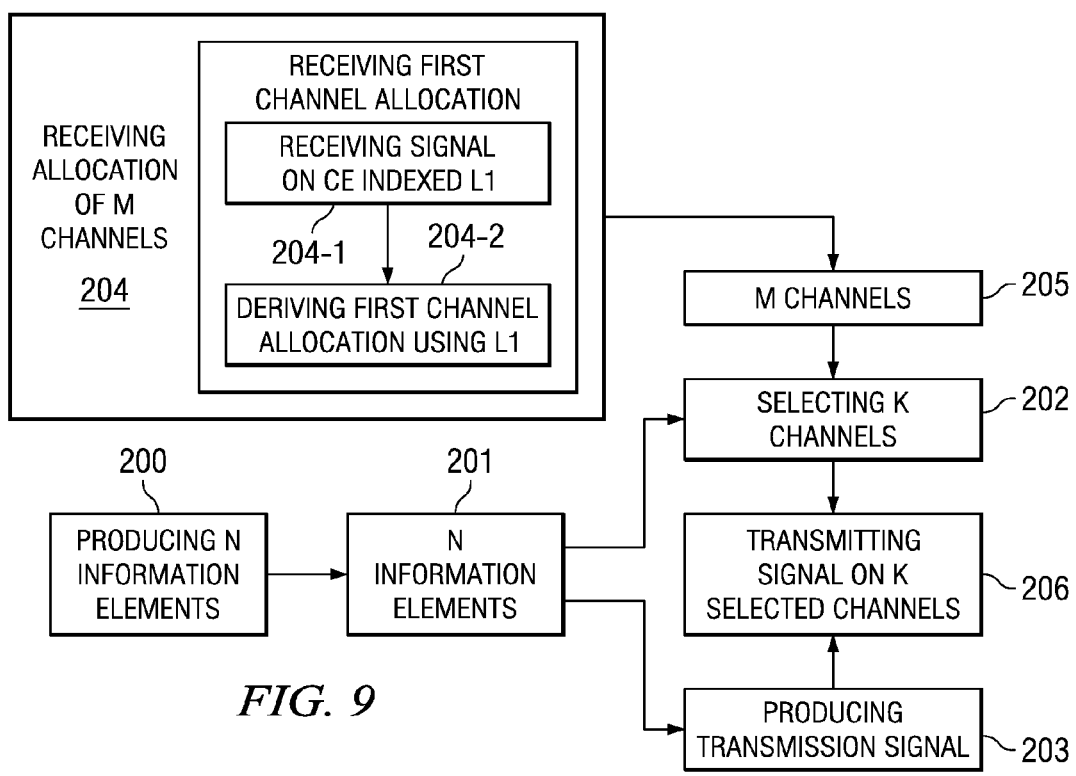
FIG. 9 is a block diagram of the transceiver of FIG. 2 for the case where at least one channel is implicitly allocated.
Figure 10:
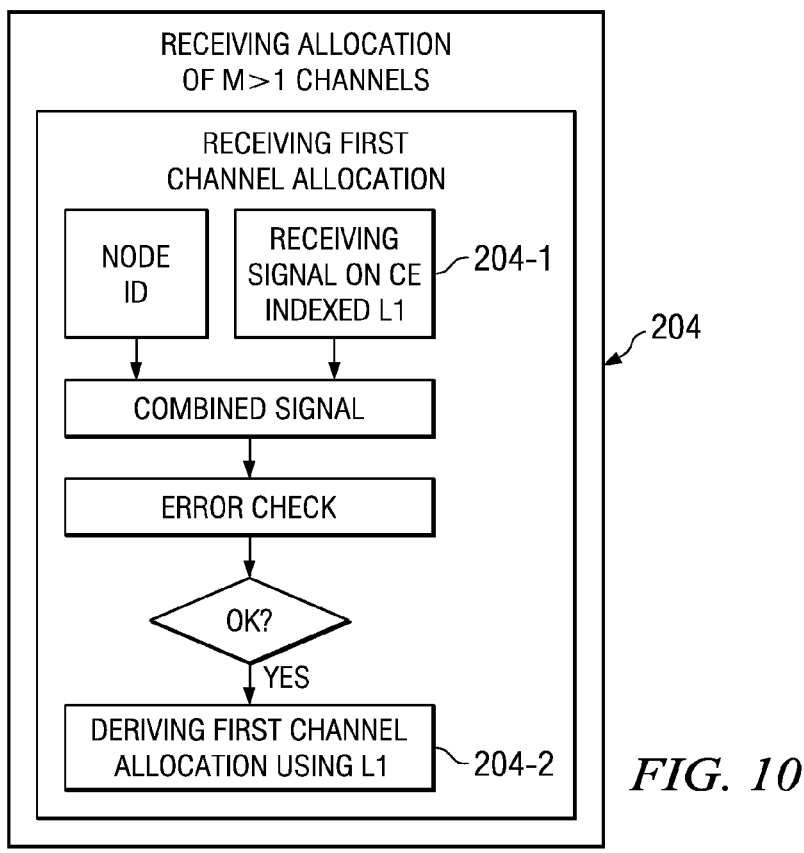
FIGS. 10-13 are block diagrams illustrating various embodiments of channel allocations used by the transceiver of FIG. 2.
Figure 11:
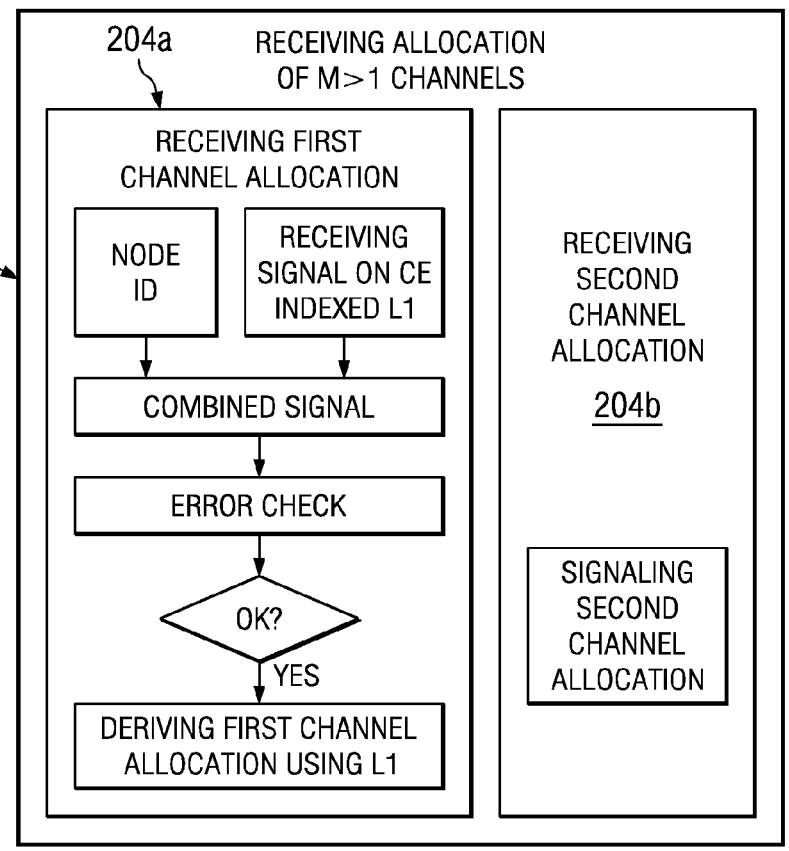

An allocation of M channels can be implicit, explicit, or a combination of the two. FIG. 9 illustrates an embodiment of the invention wherein the allocation of at least one channel (from the M channels) is implicit. With implicit allocation in FIG. 9, a UE monitors at least a control element (CE) with index L1. In some embodiments of the invention, the CE is a control channel element (CCE) which is a part of PDCCH, where PDCCH is used to signal downlink control information to the UE. If a specific signal (or a set of signals) is received on the CE with index L1, then index L1 is used to derive the first channel allocation (from the M allocated channels). The rest of the M−1 channels can be allocated implicitly or explicitly. With explicit allocation, an exact allocated channel (or an indication thereof) can be signaled to the UE. FIG. 10 shows more details on a possible embodiment of the implicit allocation for the first channel. In FIG. 10, a signal is received on CE with index L1. This signal is combined with the UE identity. In some embodiments of the invention, to produce the combined signal, the CRC portion of the received signal is de-scrambled with the UE identity (or a portion of the UE identity) (or a temporary UE identity). Subsequently, error checking or error detection is performed using the CRC portion of the signal. If the CRC "passes" the first channel allocation is derived using the index L1, which is the index of the CE, as in FIG. 10. In FIG. 11, a second channel is also allocated to the UE. As mentioned before, allocation of the second channel can be implicit or explicit.

In some embodiments of the invention, the NodeB implicitly allocates at least one channel to the UE, using a CCE. Here, the NodeB scrambles (e.g. multiplies) the CRC portion of the CCE with the UE identity (UE ID), and transmits the signal. The UE receives the signal on the CCE. Then, the UE de-scrambles the CRC portion of the CCE with the UE ID. Then, the UE performs error-detection using the descrambled CRC field. If the CRC error detection "passes," the UE knows that the CCE is allocated to the UE. Then, the UE can derive the index of the allocated channel using the index of the CCE. In some embodiments of the invention, index of the allocated channel is the same as the index of the index of the CCE. In some embodiments of the invention, indexes of the channels are mapped one-to-one via a pre defined mapping (table or formula) to indexes of the CCEs. In some embodiments of the invention, this mapping can be time-variant. For example, for a first time period index of the CCE is the same as the index of the channel, and for the second time period index of the CCE and index of the channel can differ by one.

Figure 12:
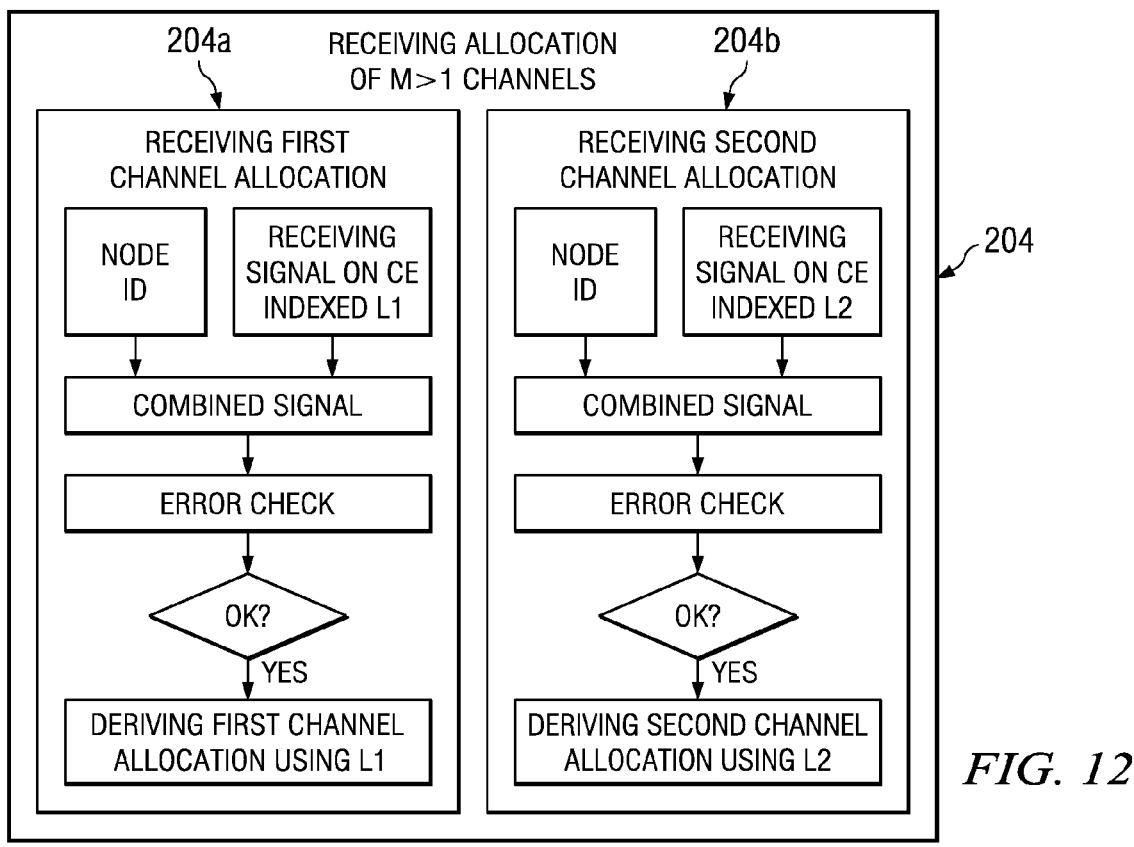

FIG. 12 shows one embodiment of the invention wherein both first and second channel are allocated implicitly. In FIG. 12, first and second channels are allocated separately to the UE, as shown in 204a and 204b. A signal from the first CE (indexed L1) is combined with the UE ID, followed by error checking and derivation of the first channel. A signal from the second CE (indexed L2) is combined with the UE ID, followed by error checking and derivation of the second channel.

Figure 13:
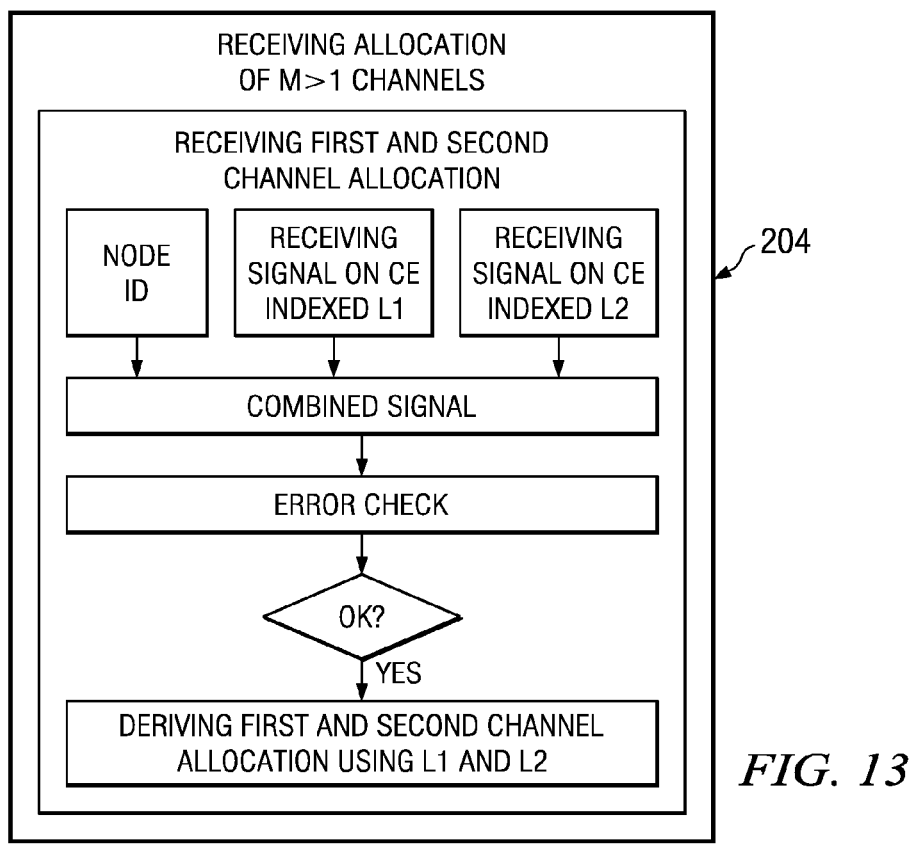

FIG. 13 shows another embodiment of the invention wherein both first and second channel are allocated implicitly. In FIG. 13, both allocation of the first and the second channel is signaled implicitly and jointly. In FIG. 13, a signal is received on both first and second CE. Then, signal from first and second CE is combined with the UE identity (ID), and if the CRC check of the combined signal passes, L1 and L2 are used to derive first and second channel allocations.

Figure 14:
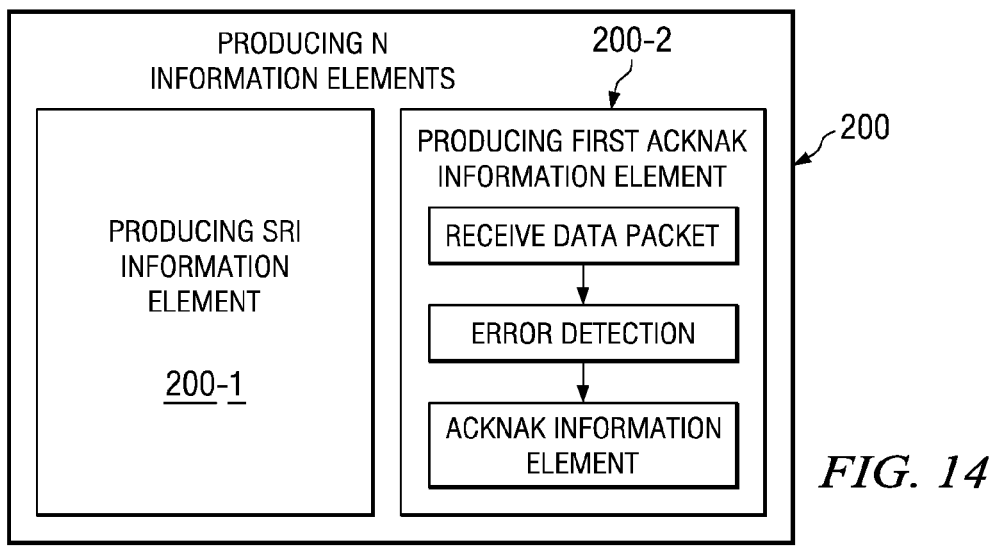
FIGS. 14-16 are block diagrams illustrating various embodiments of producing some of the N information elements by the transceiver of FIG. 2.
Figure 15:
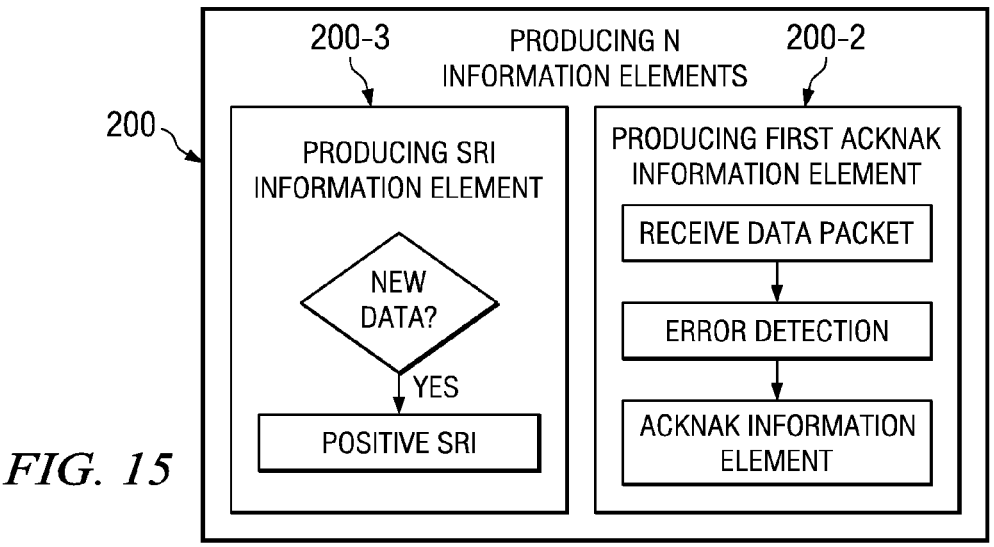
Figure 16:
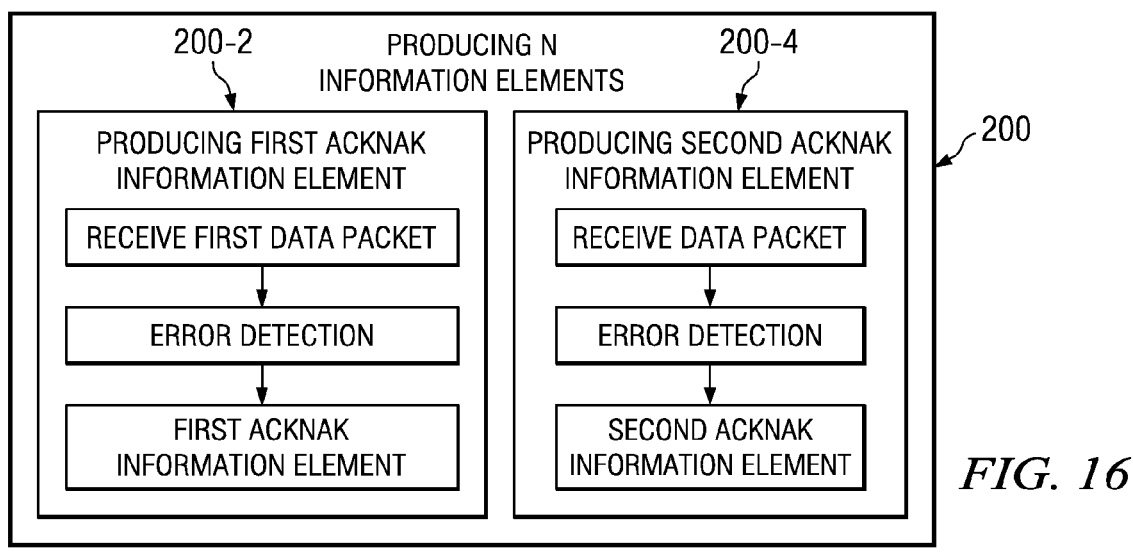

FIG. 14 shows a production of N information elements which can be used in conjunction with FIG. 2, in some embodiments. The N information elements comprise SRI information element and the (first) ACKNAK information element. In some embodiments of the invention, the first ACKNAK information element is the only ACKNAK information element. To produce the first ACKNAK information element, a data packet is received at the UE, followed by error detection (e.g. via CRC checking), wherein the result of error detection produces the ACKNAK information element. As shown in FIG. 15, in some embodiments of the invention, a positive SRI is transmitted when new data is produced at the UE. In FIG. 16, a production of N information elements comprises production of two ACKNAK information elements, where the two ACKNAK information elements can belong to two different HARQ processes. Alternatively, the two ACKNAK information elements can belong to the same HARQ process. Thus, embodiments of FIGS. 14 and 15 show a simultaneous transmission of ACKNAK and SRI whereas embodiment of FIG. 16 shows a simultaneous transmission of two ACKNAK information elements.

Figure 17:
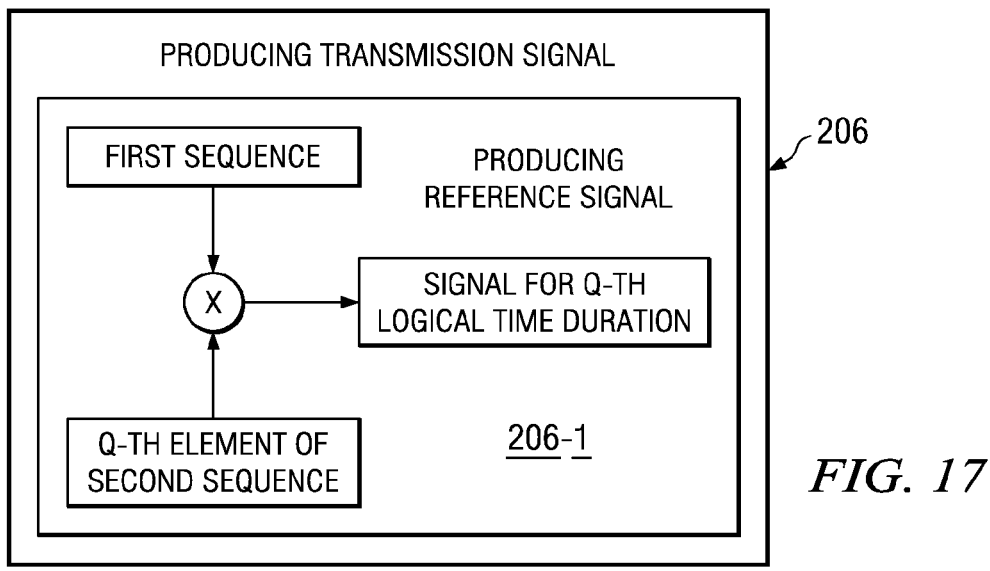
FIGS. 17-18 are block diagrams illustrating various embodiments of producing a transmission signal by the transceiver of FIG. 2.
Figure 18:
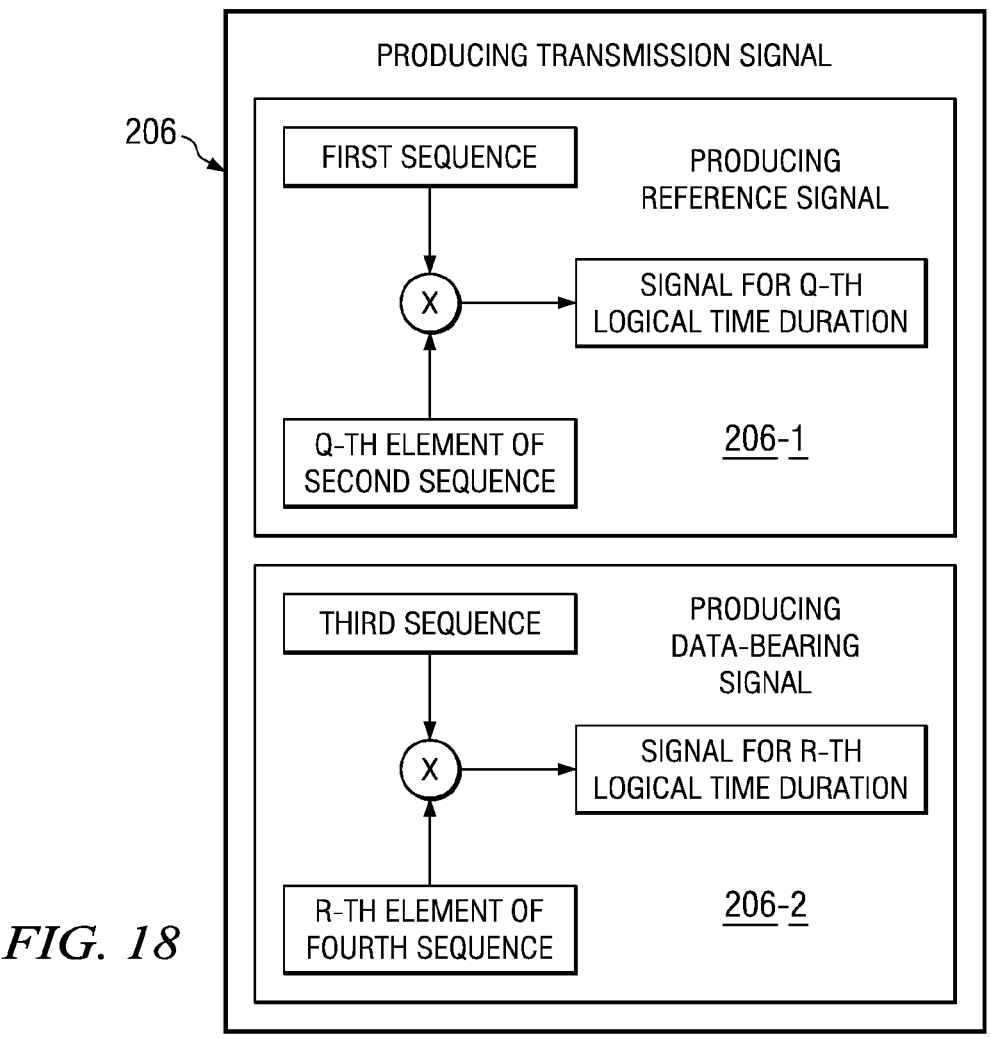
Figure 22:
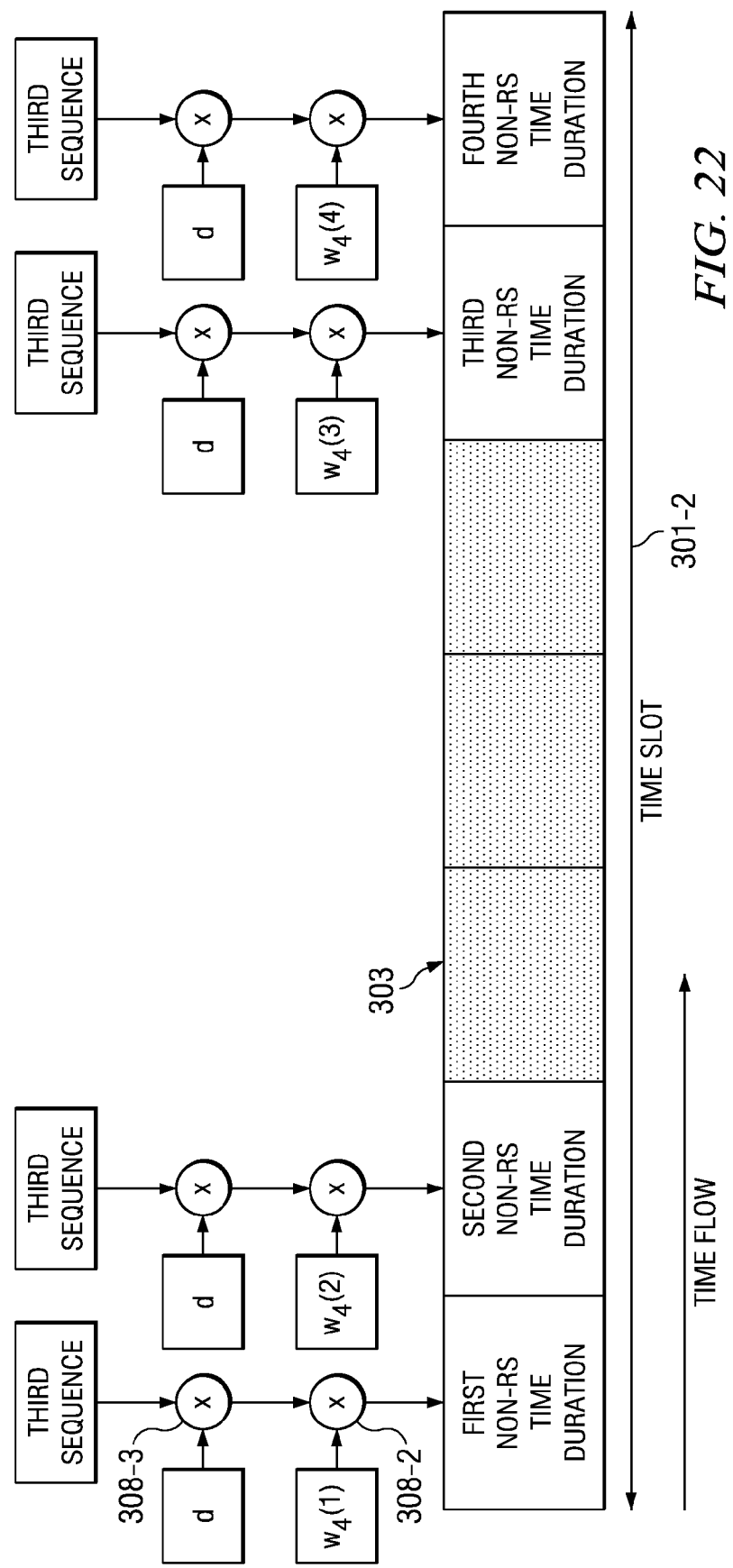

FIG. 17 shows an embodiment of producing a transmission signal using at least one of the N information elements. In some embodiments of the invention, the transmission signal comprises a reference signal (RS) which can be used for coherent data demodulation. In some embodiments of the invention, a reference signal is produced using a concept of block-spreading. The term "block-spreading" is synonymous with the term "orthogonal covering". With block-spreading, a first sequence is multiplied by the Q-th element of the second sequence to produce a reference signal for the Q-th logical time duration, as shown in FIG. 17. Similarly, the concept of block-spreading can be applied to a data-bearing signal, as shown in FIG. 18. In FIG. 18, a third sequence is multiplied by the R-th element of the fourth sequence to produce data bearing signal for an R-th logical time duration of the data bearing signal. Reference signals (RS) and data bearing signals can be separated in time. In FIG. 22, we show an exemplary time slot where RS and data-bearing signals are separated in time. Quantity d is an information bearing quantity. For example, in an embodiment of FIG. 6, the d is produced using the ACKNAK information element. For example, d=1 is transmitted for ACK and d=−1 is transmitted for NAK. Third sequence is multiplied by d thus producing modified third sequence. Block spreading of the modified third sequence is obtained using the fourth sequence [$w_4(1)\ w_4(2)\ w_4(3)\ w_4(4)$]. As shown in the diagram of FIG. 22, modified third sequence is multiplied by first element $w_4(1)$ of the fourth sequence to produce the transmission signal for the first non-RS time duration, which is the first data bearing time duration. Same procedure is repeated using $w_4(2)$, $w_4(3)$ and $w_4(4)$. Reference signal (RS) is transmitted in 303, where there are three shown RS fields. FIG. 20 is same as FIG. 22, where multiplication by d can be omitted when d=1. FIG. 21 shows transmission of a reference signal also using block-spreading (orthogonal covering). A first sequence and a second sequence are used to transmit the reference signal. The second sequence comprises three entries [$w_2(1)\ w_2(2)\ w_2(3)$].

Figure 23:
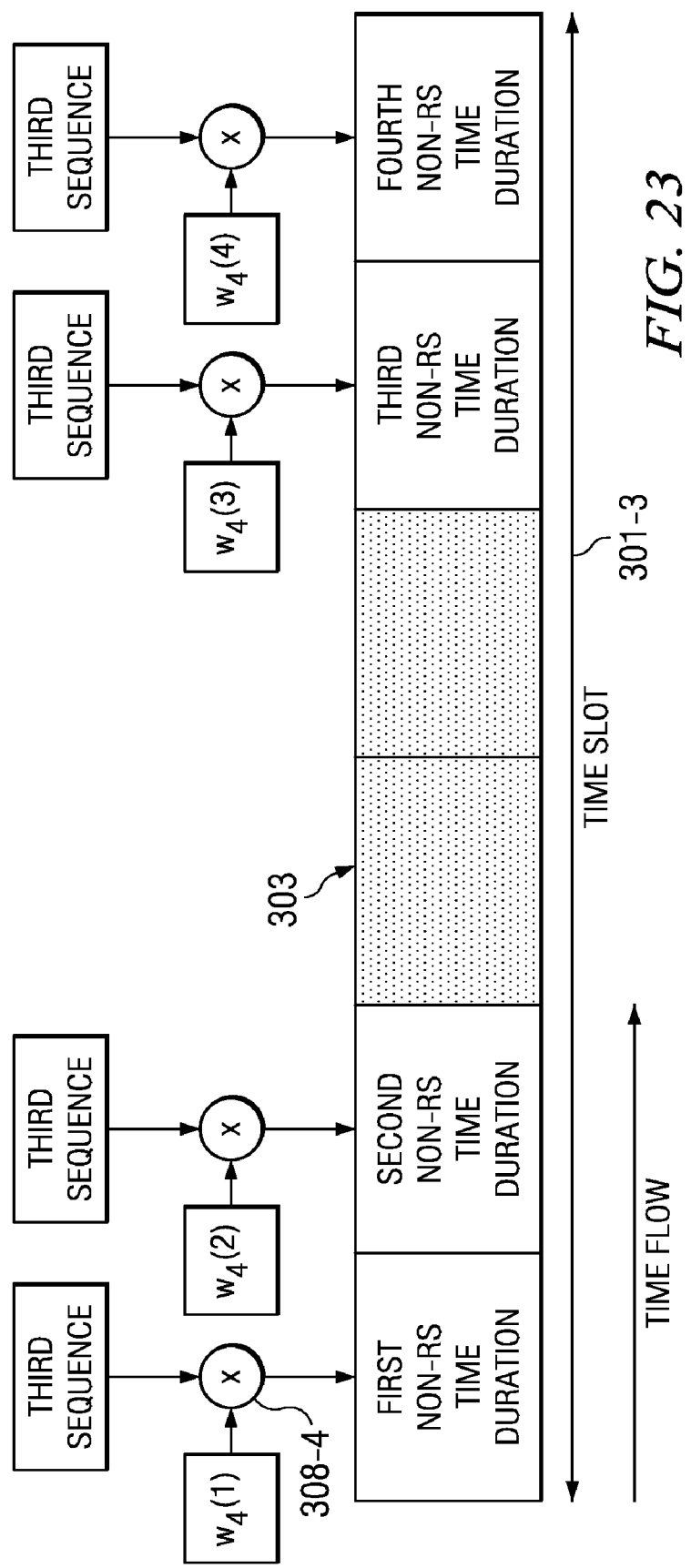
Figure 24:
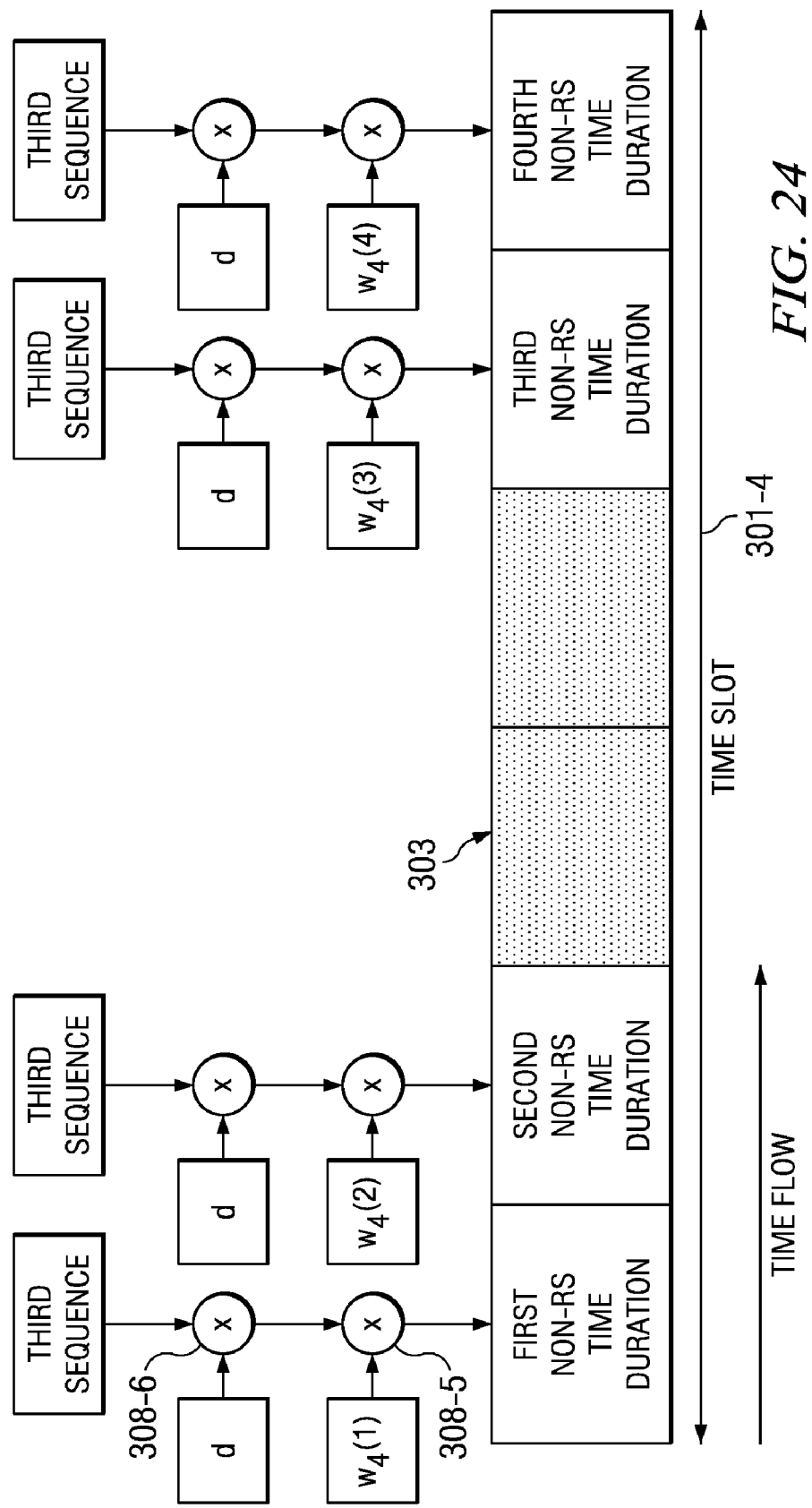
Figure 25:
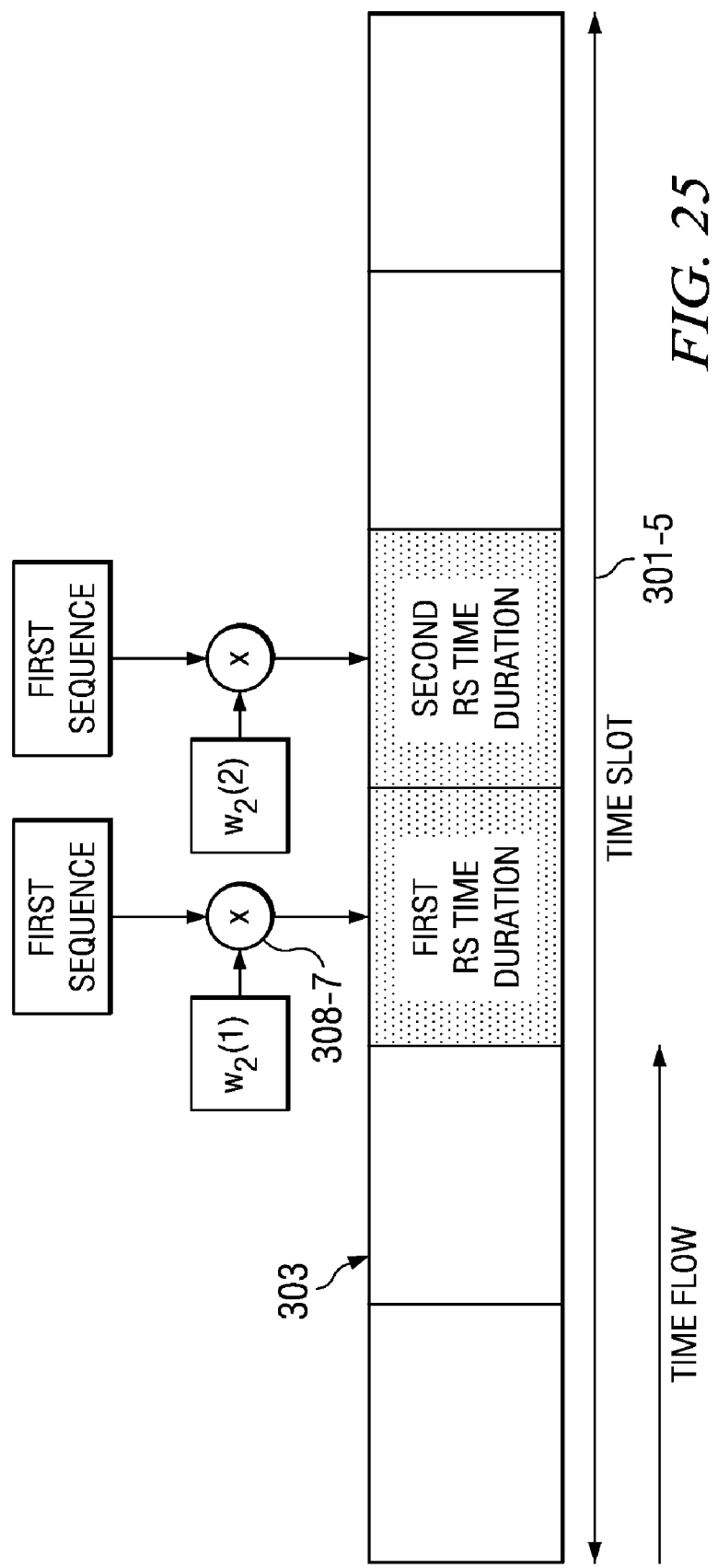

FIG. 24 shows an exemplary time-slot with only two reference signals. In FIG. 24, we show an exemplary time slot where RS and data-bearing signals are separated in time. Quantity d is an information bearing quantity. For example, in an embodiment of FIG. 6, the d is produced using the ACK-NAK information element. For example, d=1 is transmitted for ACK and d=−1 is transmitted for NAK. Third sequence is multiplied by d thus producing a modified third sequence. Block spreading of the modified third sequence is obtained using the fourth sequence [$w_4(1)\ w_4(2)\ w_4(3)\ w_4(4)$]. As shown in the diagram of FIG. 24, the modified third sequence is multiplied by first element $w_4(1)$ of the fourth sequence to produce the transmission signal for the first non-RS time duration, which is the first data bearing time duration. Same procedure is repeated using $w_4(2)$, $w_4(3)$ and $w_4(4)$. Reference signal (RS) is transmitted in 303, where there are two shown RS fields. FIG. 23 is same as FIG. 24, where multiplication by d can be omitted when d=1. FIG. 25 shows transmission of a reference signal also using block-spreading (orthogonal covering). A first sequence and a second sequence are used to transmit the reference signal. Second sequence comprises entries $[w_2(1)\ w_2(2)]$.

In some embodiments of the invention, a channel (or equivalent resource) is identified by the spectrum occupancy (resource block=RB) as well as the first sequence, second sequence, third sequence and fourth sequence. Thus, a different instance selection of these parameters produces a different channel/resource. In some embodiments of the invention, a resource is designated as ACKNAK resource if the resource is allocated through implicit allocation.

In some embodiments of the invention, the first (and third) sequence is created using entries of the following table

TABLE 1

Definition of $\phi(n)$

| u | $\phi(0), \ldots, \phi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

In Table 1, u is the index of the root sequence. In some embodiments of the invention, all UEs in the cell use only one root sequence $\phi(n)$ of length 12. In order to produce the first sequence, the UE applies operation $\exp(j*n*\alpha + j*\pi*\phi(n)/4)$. Selection of phase ramp (time-domain cyclic shift) $\alpha$ thus produces a different instance of the first sequence. There are 12 possible values for $\alpha$ quantizing the interval $[0, 2\pi]$, and thus there are 12 possible instances of the first sequence. Thus, in some embodiments of the invention, $\alpha$ is selected from the set $\{0, 1, 2 \ldots, 11\}*\pi/6$. In order to produce the third sequence, the UE applies operation $\exp(j*n*\alpha + j*\pi*\phi(n)/4)$. Selection of phase ramp (time-domain cyclic shift) $\alpha$ thus produces a different instance of the third sequence. There are 12 possible values for $\alpha$ (uniformly) quantizing the interval $[0, 2\pi]$, including 0, and thus there are 12 possible instances of the third sequence. In some embodiments of the invention, a single value for $\alpha$ is used to construct the first sequence and the third sequence (which are then the same). In some embodiments of the invention, different values for $\alpha$ are used to produce the first sequence and the third sequence.

In some embodiments of the invention, block spreading of length 2, 3, or 4 is used. For block-spreading of length 2, sequences [1 1] and [1 −1] can be used as instances of a block-spreading sequence. For block-spreading of length 3, sequences [1 1 1], and [1 exp(j*2*π/3) exp(j*4*π/3)] and [1 exp(j*4*π/3) exp(j*2*π/3)] can be used. For block-spreading of length 4, Hadamard codes of length 4 can be used, or a subset of them, such as [1 1 1 1] and [1 −1 1 −1] and [1 −1 −1 1]. Second sequence is a block-spreading sequence. Fourth sequence is a block-spreading sequence.

Figure 19:
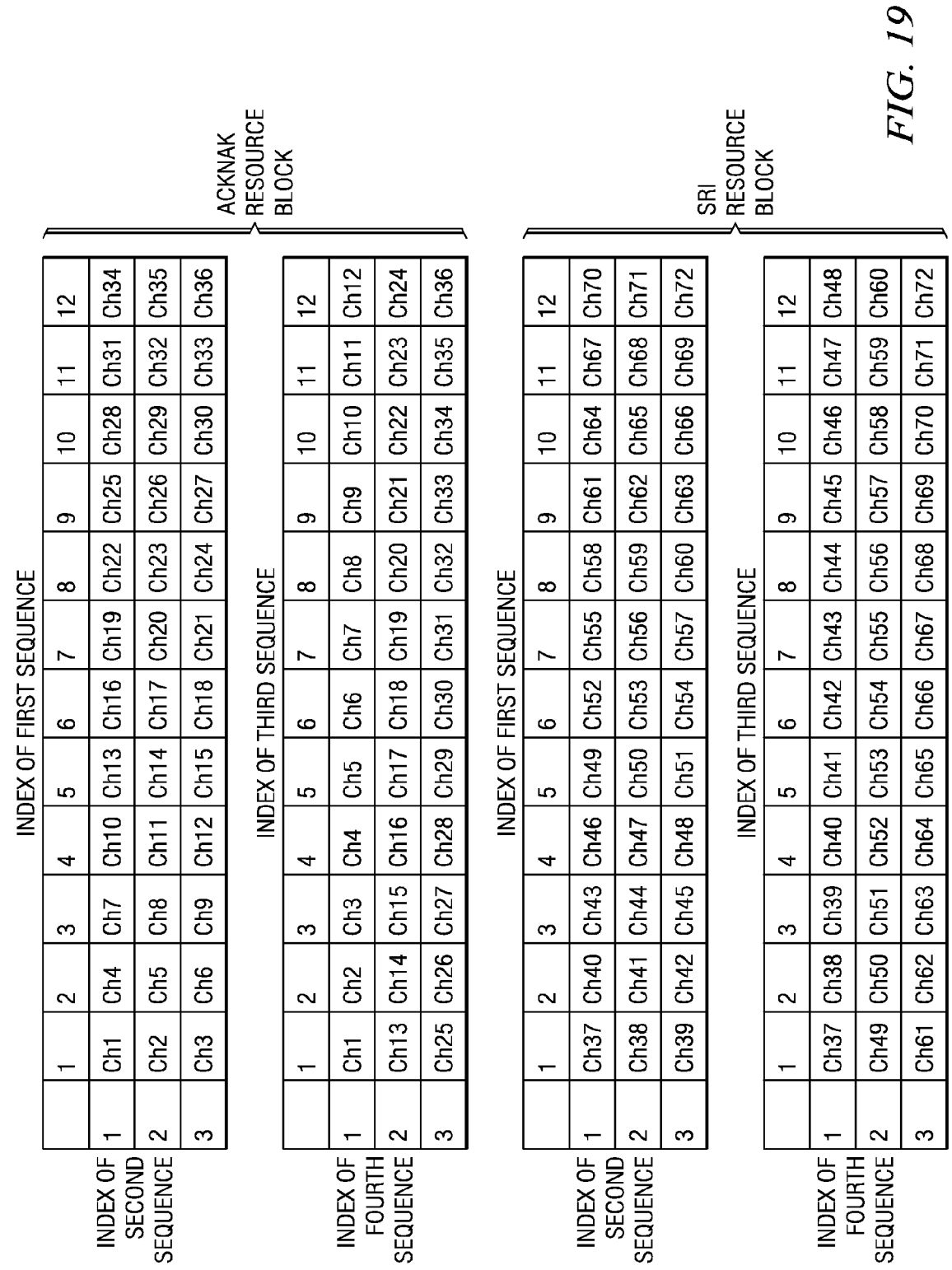
FIG. 19 illustrates a structure of channels used in one embodiment.

In some embodiments of the invention, a particular channel is defined by spectrum occupancy, first sequence, second sequence, third sequence, fourth sequence, examples of which are illustrated in FIG. 19. In some embodiments of the invention, there are 12 possible instances for first and third sequence as described above. In some embodiments of the invention, there are 3 possible instances for the second and fourth sequence as described above. A reference signal RS is transmitted on the same spectrum occupancy (resource block=tone block=sub-carrier block) as the data bearing signal. Thus, for any given resource block (spectrum occupancy), there are 12*3=36 possible channels/resources. In some embodiments of the invention, there is a separate resource block designated as ACKNAK resource block and a separate resource block designated as SRI resource block. In such case there are at least 72 possible channels. A UE receives an allocation of M of these channels.

In some embodiments of the invention, receiving an allocation can be implicit or explicit. With implicit allocation, a UE receives a signal on at least a channel element (CE) which can be a control channel element (CCE). A signal can be received on more than one CE. The UE then looks at the signal from the CE and descrambles the signal for CRC (cyclic redundancy check) with the UE identity, or a part of the UE identity. The UE then performs CRC for error detection. If error detection produces no errors, the UE knows that the signal was for the UE. The UE also knows that the particular CCE was allocated to that UE. The UE then uses the index of the CCE to derive an allocated physical channel. This can be via direct pre-defined mapping from the CCE index to an uplink PUCCH resource. In some embodiments of the invention, this can be using a function f(t, L1)->physical channel (PUCCH) which maps the CCE index L1 to a PUCCH resource. Here, t is some shared time reference. In either case, received CCE index L1 is used to identify the PUCCH channel/resource.

In the 3GPP DL control channel, the length of each user's DL control channel varies depending on the user location or its SINR (Signal-to-Interference-and-Noise-Ratio) geometry. In other words, each user's DL control channel may consist of several control channel elements (CCEs), which is defined as some aggregation of time-frequency resources. Notice that for a user at high SINR geometry, it is more likely that a small number of CCEs are sufficient for its DL control channel. In contrast, for users with worse downlink SINR, more CCEs can be allocated. With implicit allocation, the UE performs blind decoding, and discovers the allocated CCE via CRC check scrambled by the UE ID. In some embodiments of the invention, each CCE corresponds to one allocated uplink channel (with implicit allocation).

Previously, when a user had multiple physical channels, it was pre-defined that only one of the channels would be used (e.g. the first channel assigned to the user), irrespective how many control/data information bits to transmit. Alternatively, some prior art may permit simultaneous transmission of signals on all physical channels, which increases the peak to average power ratio (PAPR) of the transmission. In this disclosure, however, a part or all available channels are assigned to the user for the transmission of control/data information bits, thus, in effect, performing a combination of coherent and non-coherent communication. This disclosure focuses on the case where a few uplink control signaling bits need to be transmitted on one (or a few) of the multiple uplink control channels. In some embodiments of the invention, part of the uplink control signaling bits are used to perform uplink control channel selection, while the rest of the uplink control signaling bits determines the modulated (e.g. BPSK, QPSK, 8PSK) symbol to modulate the transmitted signal in the selected uplink control channel.

For example, in some embodiments of the invention, when a user is assigned with M physical channels, and has N information bits to transmit, it can first use $\log_2(M)$ information bits to select one of the M physical channels. Here, "information bits" can mean "control information bits," or "data information bits." Then, the rest $(N-\log_2(M))$ information bits decide which QAM (or PSK) symbol to modulate the transmitted signal on the selected physical channel. Thus, in an embodiment of this invention, a part of the transmitted information is encoded in the selection of the physical channel, from the set of allocated physical channels (via CCE implicit mapping), whereas the remaining part of information is communicated on the selected physical channel. Note that the number of CCEs (allocated to the user) is typically the same as the number of allocated uplink physical channels, because of the implicit mapping used to communicate downlink control.

For example, the following suggest various combinations of multiple information elements that may be transmitted using multiple allocated channels:
  UL ACK/NAK only
  UL ACK/NAK+UL SRI
  UL ACK/NAK+rank feedback
  UL ACK/NAK+rank feedback+UL SRI
  UL ACK/NAK+MCS/PMI
  Rank Feedback
  MCS/PMI index+SRI
  Other Configurations In some embodiments of the invention, two channels are allocated. In some embodiments of the invention, one bit performs channel selection, another bit is BPSK modulated. For example, the two bits can be two ACKNAK bits. Alternatively, one bit can be ACKNAK bit, whereas the other bit can be SRI bit (or could be rank-feedback bit). For a case of three bit control channel feedback, one bit performs channel selection, the other two bits are QPSK modulated. For four bit control channel feedback, one bit performs channel selection, the other three bits are 8-PSK modulated. For five bit Control channel feedback, one bit performs channel selection, the other four are 16QAM modulated.

In some embodiments of the invention, four channels are allocated. In some embodiments of the invention, this case can be treated by neglecting two out of four channels (and reducing it to case of two allocated channels). In some embodiments of the invention, two bit control channel feedback can be made as follows. Two bits are mapped into four hypothesis {00, 01, 10, 11}, which each of which selects only one out of four physical channels. In some embodiments of the invention, three bit control channel feedback can be made as follows. Two bits select one out of four available physical channels. The remaining bit is used to BPSK modulate on the selected physical channel. In some embodiments of the invention, four bit control channel feedback can be made as follows. Two bits select one out of four available physical channels. The remaining two bits are used to QPSK modulate on the selected physical channel. In some embodiments of the invention, five bit control channel feedback can be made as follows. Two bits select one out of four available physical channels. The remaining three bits are used to 8PSK modulate on the selected physical channel.

In some embodiments of the invention, eight channels are allocated. In some embodiments of the invention, this case can be treated by neglecting six out of eight channels (and reducing it to case of two allocated channels). In some embodiments of the invention, two bit control channel feedback can be made as follows. Two bits are mapped into four hypotheses {00, 01, 10, 11}, which each of which selects only one out of four physical channels. In some embodiments of the invention, three bit control channel feedback can be made as follows. Three bits select one out of eight available physical channels, which means that there are 8 hypotheses. In some embodiments of the invention, four bit control channel feedback can be made as follows. Three bits select one out of eight available physical channels. Remaining bit BPSK modulates the signal on the selected physical channel. In some embodiments of the invention, five bit control channel feedback can be made as follows. Three bits select one out of eight available physical channels. Remaining two bits QPSK modulates the signal on the selected physical channel.

As described above, receiving an allocation can be implicit or explicit. With implicit allocation, a UE receives a signal on at least a channel element (CE) which can be a control channel element (CCE). Signal can be received on more than one CE. The UE then looks at the signal at the CE. The UE descrambles the signal for CRC with the UE identity, or a part of the UE identity. The UE then performs CRC for error detection. If error detection produces no errors, the UE knows that the signal was for the UE. The UE also knows that the CCE was allocated to that UE.

Referring again to FIG. 10, for example, in functional unit 204-2, the UE then uses the index of the CCE to derive an allocated physical channel. This can be via direct pre-defined mapping from the CCE index to an uplink PUCCH resource. In some embodiments of the invention, this can be using a function $f(t, L1)$->physical channel (PUCCH) which maps the CCE index L1 to a PUCCH resource. Here, t is some shared time reference. In either case, received CCE index L1 is used to identify the PUCCH channel/resource. A channel is defined by a: resource block (spectrum occupancy), first sequence, second sequence, third sequence, and fourth sequence. Some of these sequences can be the same, some can be different. Logical time duration is OFDM symbol. A channel can also be referred to as resource or any other equivalent term. In some embodiments of the invention, 0.5 ms slot is substantially (approximately) 0.5 ms, short of transition times, power ramping, etc. Symbols are OFDM symbols. In some embodiments of the invention channel is a PUCCH resource. PUCCH=physical uplink control channel.

N information elements are produced in functional unit 200. In some embodiments of the invention, information element can be a random quantity. In some embodiments of the invention, it can be a bit. In some embodiments of the invention, it can be a 3-state quantity. In some embodiments of the invention, it can be N-state quantity. In some embodiments of the invention it can be an analog quantity. In main embodiments of the invention, forward link is from NodeB to UE (aka downlink), whereas reverse link is from UE to NodeB (aka uplink). In other embodiments of the invention, this direction can be reversed.

In some embodiments of the invention, the information comprises ACKNAK information. In some embodiments of the invention the ACKNAK information is produced by receiving a data packet and performing an error check (CRC) on the data packet. If the CRC check passes, an ACK is sent. If the CRC fails, a NAK is transmitted. So, ACKNAK is either an ACK or a NAK. In some embodiments of the invention, information comprises scheduler request indicator (SRI) information. The SRI can be also called SR which is shorter version, or any other equivalent term. The SRI is a request that a UE sends to the NodeB, by which the UE requests to be scheduled for transmission. In some embodiments of the invention, SRI is triggered by an arrival of a new data. In some embodiments of the invention, information comprises both ACKNAK information and SRI information which are transmitted concurrently. In some embodiments of the invention, SRI is a bit of information, which is either a positive scheduling request or a negative scheduling request.

Referring again to FIGS. 2-9, the N information elements are adjusted in functional unit 201. In some embodiments of the invention, SRI bit is used to select the channel, and the ACKNAK bit is used to modulate the signal on the channel (using d).

Functional unit 202 uses a portion of the information elements as adjusted by unit 201 to select a set K of channels from the M allocated channels. In some embodiments of the invention K=1 is used. This option K=1 can be used to produce a single-carrier signal. In some embodiments of the invention, a different K can be possible. In some embodiments of the invention, K doesn't depend on the information to be sent. In some embodiments of the invention K can depend on the information to be sent. Transmitter unit 206 then transmits the signal produced by unit 203 on the selected group of K reverse link channels provided by unit 202 as transmitted signal 207.

Referring again to FIG. 3 which is a more detailed block diagram of the transceiver of FIG. 2 illustrating production of an ACKNAK information element in unit 200, in some embodiments of the invention, the ACKNAK information element may be used by unit 202 to select K channels. If more than one ACKNAK information element is produced, then a portion is used by unit 202 to select K channels, as described earlier.

Referring again to FIG. 4 which is a more detailed block diagram of the transceiver of FIG. 2 illustrating production of a scheduling request indicator (SRI) information element in unit 200, in some embodiments of the invention, the SRI information element may be used by unit 202 to select K channels, as described earlier.

Referring again to FIG. 5 which is a more detailed block diagram of the transceiver of FIG. 2 illustrating production of both an ACKNAK information element and an SRI information element in unit 200 to produce multiple information elements, t The multiple information elements are then adjusted in unit 201 and an adjusted portion of the multiple information elements is then used by unit 202 to select K channels. Another adjusted portion of the multiple information units is used by unit 203 to produce the transmission signal.

Figure 7:
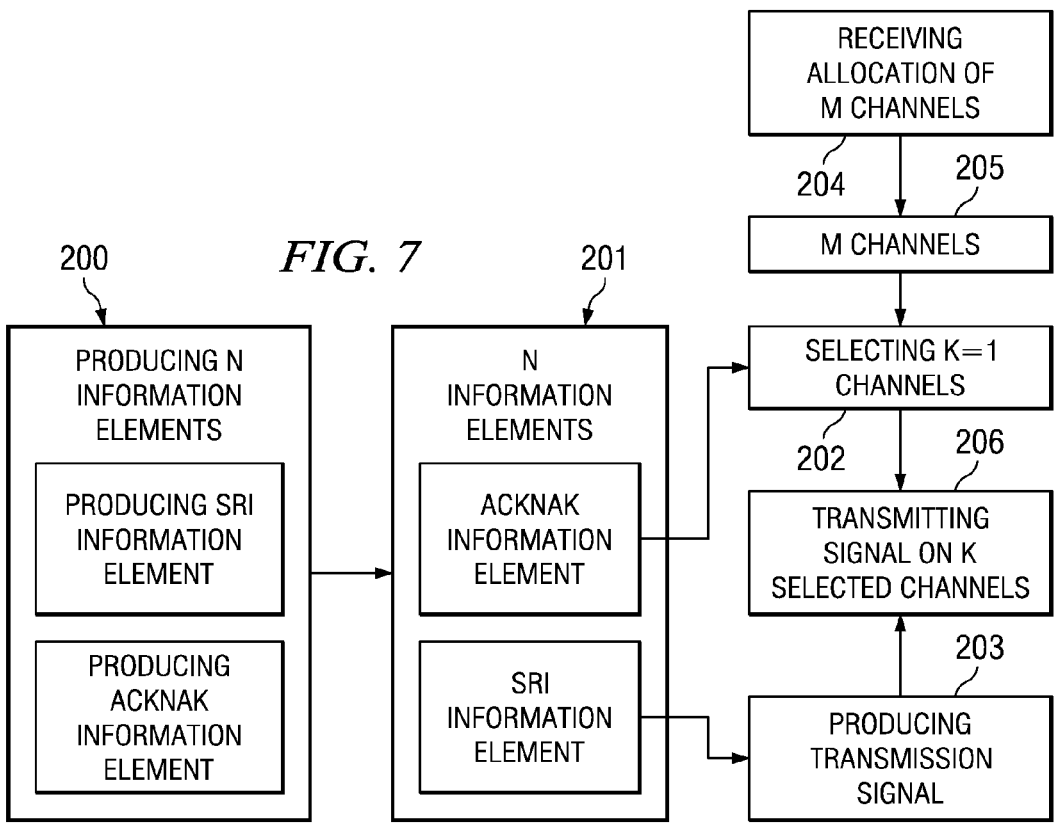

Referring again to FIGS. 6 and 7 which are more detailed block diagrams of the transceiver of FIG. 2 illustrating selection of K=1 channels for transmission, FIG. 6 illustrates use of the SRI information element to select the K=1 channel and the use of the ACKNAK information element to produce the transmission signal. FIG. 7 illustrates use of the ACKNAK information element to select the K=1 channel and the use of the SRI information element to produce the transmission signal.

Referring again to FIG. 8 which is a more detailed block diagram of the transceiver of FIG. 2 illustrating production of two ACKNAK information elements in unit 200, when more than one ACKNAK information element is produced, then a portion is used by unit 202 to select K channels, as described earlier.

Referring again to FIG. 9 which is a more detailed block diagram of the transceiver of FIG. 2 illustrating reception of channel allocations in unit 204. Unit 204-1 receives a signal on at least one forward link channel element (CE) indexed L1, unit 204-2 then uses index L1 to derive at least a first allocated reverse link channel, as described in more detail earlier.

Referring again to FIGS. 10-13 which are block diagrams illustrating various aspects of channel allocation by the transceiver of FIG. 2, in FIG. 10, unit 204-1 receives a signal on at least one forward link channel element (CE) indexed L1. The UE node ID, or a portion of it, is then combined with the received signal to form a combined signal. An error check is then performed on the combined signal. If the error check is negative, meaning no error detected, then unit 204-2 uses L1 to derive at least the first allocated reverse link channel.

In FIG. 12, unit 204a receives a signal on at least one forward link channel element (CE) indexed L1. The UE node ID, or a portion of it, is then combined with the received signal to form a combined signal. An error check is then performed on the combined signal. If the error check is negative, meaning no error detected, then L1 is used to derive at least the first allocated reverse link channel. Similarly, unit 204b receives a signal on at least one forward link channel element (CE) indexed L2. The UE node ID, or a portion of it, is then combined with the received signal to form a combined signal. An error check is then performed on the combined signal. If the error check is negative, meaning no error detected, then L2 is used to derive at least a second allocated reverse link channel. Typically, the same functional unit will be used to perform the operation of unit 204a and 204b in a time sequential manner. However, another embodiment may have duplicate units, for example.

In FIG. 13, unit 204 receives a signal on at least one forward link channel element (CE) indexed L1 and also a forward link CE indexed L2. The UE node ID, or a portion of it, is then combined with the received signal to form a combined signal. An error check is then performed on the combined signal. If the error check is negative, meaning no error detected, then L1 is used to derive at least the first allocated reverse link channel and L2 is used to derive at least a second allocated reverse link channel.

Referring again to FIGS. 14-16 which are block diagrams illustrating various aspects of producing N information elements by the transceiver of FIG. 2, ACKNAK information is produced by receiving a data packet and performing an error check (CRC) on the data packet, as illustrated in module 200-2. If the CRC check passes, an ACK is sent. If the CRC fails, a NAK is transmitted. So, ACKNAK is either an ACK or a NAK. In some embodiments of the invention, information comprises scheduler request indicator (SRI) information, as illustrated in module 200-1. In some embodiments of the invention, SRI is triggered by an arrival of a new data, as illustrated in module 200-3 of FIG. 15. In some embodiment, a first ACKNAK information element is produced as illustrated in module 200-2 of FIG. 16, and a second ACKNAK information element is formed in a similar manner based on error detection performed on a second packet of data, as illustrated in module 200-4.

Referring again to FIGS. 17-18 which are block diagrams illustrating various aspects of transmitting a signal on K selected channels by the transceiver of FIG. 2, in FIG. 17, each symbol for a reference signal slot is formed in unit 206-1 by multiplying a first sequence selected by unit 202 by a Q-th element of the second sequence, which represents the block spreading sequence of the channel selected by unit 202.

In FIG. 18, each symbol for a reference signal slot is formed in unit 206-1 by multiplying a first sequence of the channel selected by unit 202 by a Q-th element of the second sequence, which represents the block spreading sequence of the channel selected by unit 202. Similarly, each symbol for a data-bearing signal slot is formed in unit 206-2 by multiplying a third sequence of the channel selected by unit 202 by a Q-th element of the fourth sequence, which represents the block spreading sequence of the channel selected by unit 202.

Referring again to FIG. 20, the third sequence is element-wise multiplied by the selected fourth sequence in a multiplier indicated in general as 308. Three reference slots 303-1-303-3 are included in time slot 301.

The result of the element-wise multiplication is mapped onto a designated set of tones (sub-carriers) using a tone map. In some embodiments of the invention, the UE next performs IFFT of the mapped signal and a cyclic prefix is created and added form a final fully formed uplink signal 207 illustrated in FIG. 2.

Referring again to FIG. 21 which illustrates how the entire first sequence is element-wise multiplied by a selected second sequence in a multiplier indicated in general as 308-1. Three RS time durations are contained in time slot 301-1.

Referring again to FIG. 22, which illustrates how the entire third sequence is element-wise multiplied by a selected fourth sequence in a multiplier indicated in general as 308-2, the entire third sequence is also element-wise multiplied by a scaling factor d in a multiplier indicated in general as 308-3. Three reference signal time durations 303 are included in time slot 301-2.

Referring again to FIG. 23 which illustrates how the third sequence is element-wise multiplied by the selected fourth sequence in a multiplier indicated in general as 308-4, two reference signal time durations 303 are included in time slot 301-3

Referring again to FIG. 24 which illustrates how the entire third sequence is element-wise multiplied by a selected fourth sequence in a multiplier indicated in general as 308-5, the entire third sequence is also element-wise multiplied by a scaling factor in a multiplier indicated in general as 308-6. Two reference signal time durations 303 are included in time slot 301-4.

Referring again to FIG. 25 which illustrates how the entire first sequence is element-wise multiplied by a selected second sequence in a multiplier indicated in general as 308-7, two RS time durations 303 are contained in time slot 301-5.

Figure 26:
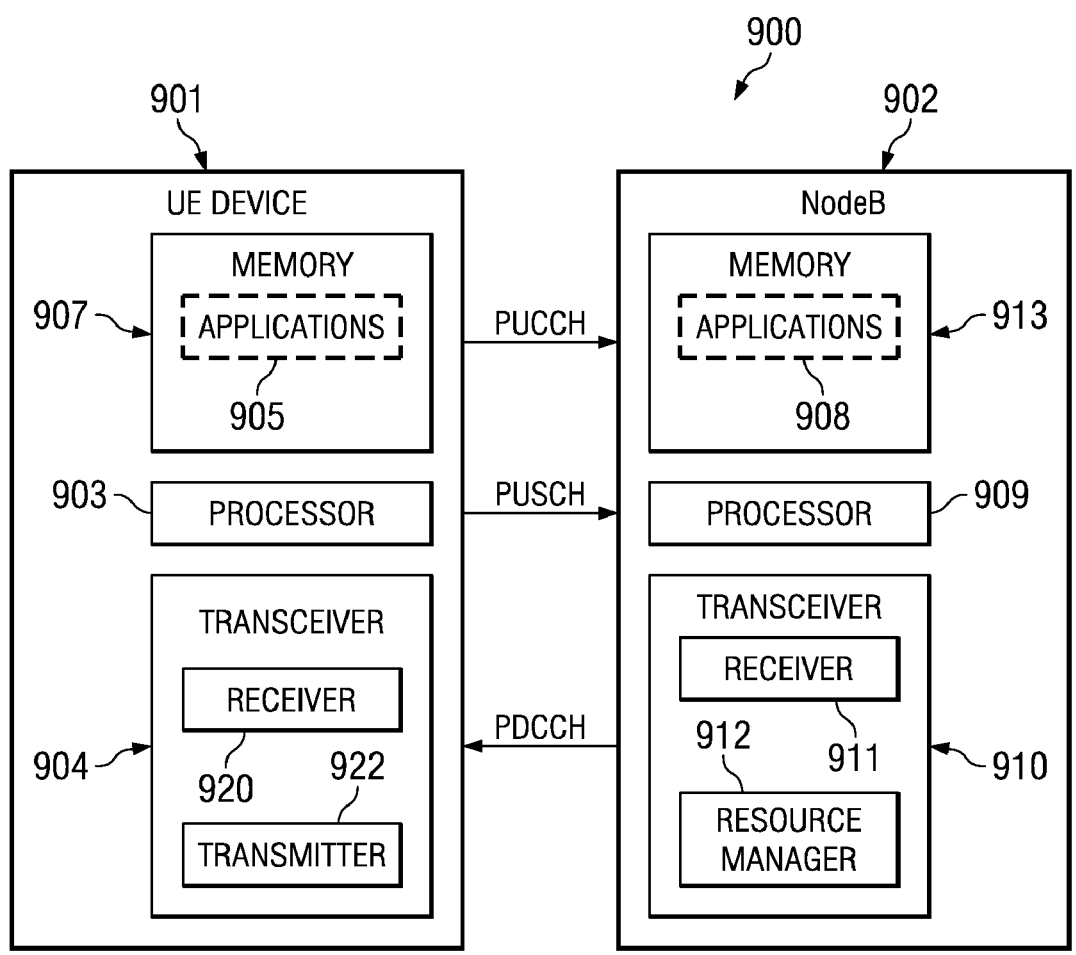
FIG. 26 is a block diagram of a Node B and a User Equipment for use in the network system of FIG. 1.

FIG. 26 is a block diagram illustrating operation of an eNB and a mobile UE in the network system of FIG. 1. As shown in FIG. 26, wireless networking system 900 comprises a mobile UE device 901 in communication with an eNB 902. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the eNB 902 based on a LTE or E-UTRAN protocol. Alternatively, another communication protocol now known or later developed can be used.

As shown, the mobile UE device 901 comprises a processor 903 coupled to a memory 907 and a Transceiver 904. The memory 907 stores (software) applications 905 for execution by the processor 903. The applications 905 could comprise any known or future application useful for individuals or organizations. As an example, such applications 905 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 905, at least some of the applications 905 may direct the mobile UE device 901 to transmit UL signals to the eNB (base-station) 902 periodically or continuously via the transceiver 904. In at least some embodiments, the mobile UE device 901 identifies a Quality of Service (QoS) requirement when requesting an uplink resource from the eNB 902. In some cases, the QoS requirement may be implicitly derived by the eNB 902 from the type of traffic supported by the mobile UE device 901. As an example, VOIP and gaming applications often involve low-latency uplink (UL) transmissions while High Throughput (HTP)/Hypertext Transmission Protocol (HTTP) traffic can involve high-latency uplink transmissions.

Transceiver 904 includes uplink logic which may be implemented by execution of instructions that control the operation of the transceiver. Some of these instructions may be stored in memory 907 and executed when needed. As would be understood by one of skill in the art, the components of the Uplink Logic may involve the physical (PHY) layer and/or the Media Access Control (MAC) layer of the transceiver 904. Transceiver 904 includes one or more receivers 920 and one or more transmitters 922. The transmitter(s) may be embodied as described with respect to FIGS. 2-25. In particular, as described above, an allocation of M>1 reverse link channels for transmission of N>0 information elements is received on receiver 920 from NodeB 902 via the PDCCH. N information elements are produced within transceiver 904. A group of K reverse link channels is selected from the M allocated reverse link channels, using at least one of the N produced information elements, wherein the group of K reverse link channels comprises at least one channel, such that 0<K<M. A signal is produced using less than all of the N produced information elements, and the produced signal is transmitted on the selected group of K reverse link channels, as was described in more detail above with respect to FIGS. 2-25.

As shown in FIG. 26, the eNB 902 comprises a Processor 909 coupled to a memory 913 and a transceiver 910. The memory 913 stores applications 908 for execution by the processor 909. The applications 908 could comprise any known or future application useful for managing wireless communications. At least some of the applications 908 may direct the base-station to manage and to receive transmissions to or from the user device 901.

Transceiver 910 comprises an uplink Resource Manager 912, which enables the eNB 902 to selectively allocate uplink PUCCH and/or PUSCH resources to the user device 901. As would be understood by one of skill in the art, the components of the uplink resource manager 912 may involve the physical (PHY) layer and/or the Media Access Control (MAC) layer of the transceiver 910. Transceiver 910 includes a Receiver 911 for receiving transmissions from various UE within range of the eNB and a transmitter for transmission to various UE within range of the eNB.

Uplink resource manager 912 executes instructions that control the operation of transceiver 910. Some of these instructions may be located in memory 913 and executed when needed. Resource manager 912 controls the transmission resources allocated to each UE that is being served by eNB 902 and sends control information via the physical downlink control channel PDCCH and/or via RRC signaling. In particular, for the transmission of information elements from UE 901, eNB 902 determines an allocation of M>1 reverse link channels for transmission of N>0 information elements and conveys the allocation to UE 901 via the PDCCH and/or via RRC signaling. Receiver 911 receives a transmitted signal from UE 901 via PUCCH and/or via RRC signaling that is produced from a signal using at least one of the N information elements. The signal is produced on a channel selected from the allocation of M>1 reverse link channels that is selected using at least one of the N information elements. Thus, by determining the channel number and the information on the channel, the eNB can recover all of the N information elements transmitted by UE 901.

Figure 27:
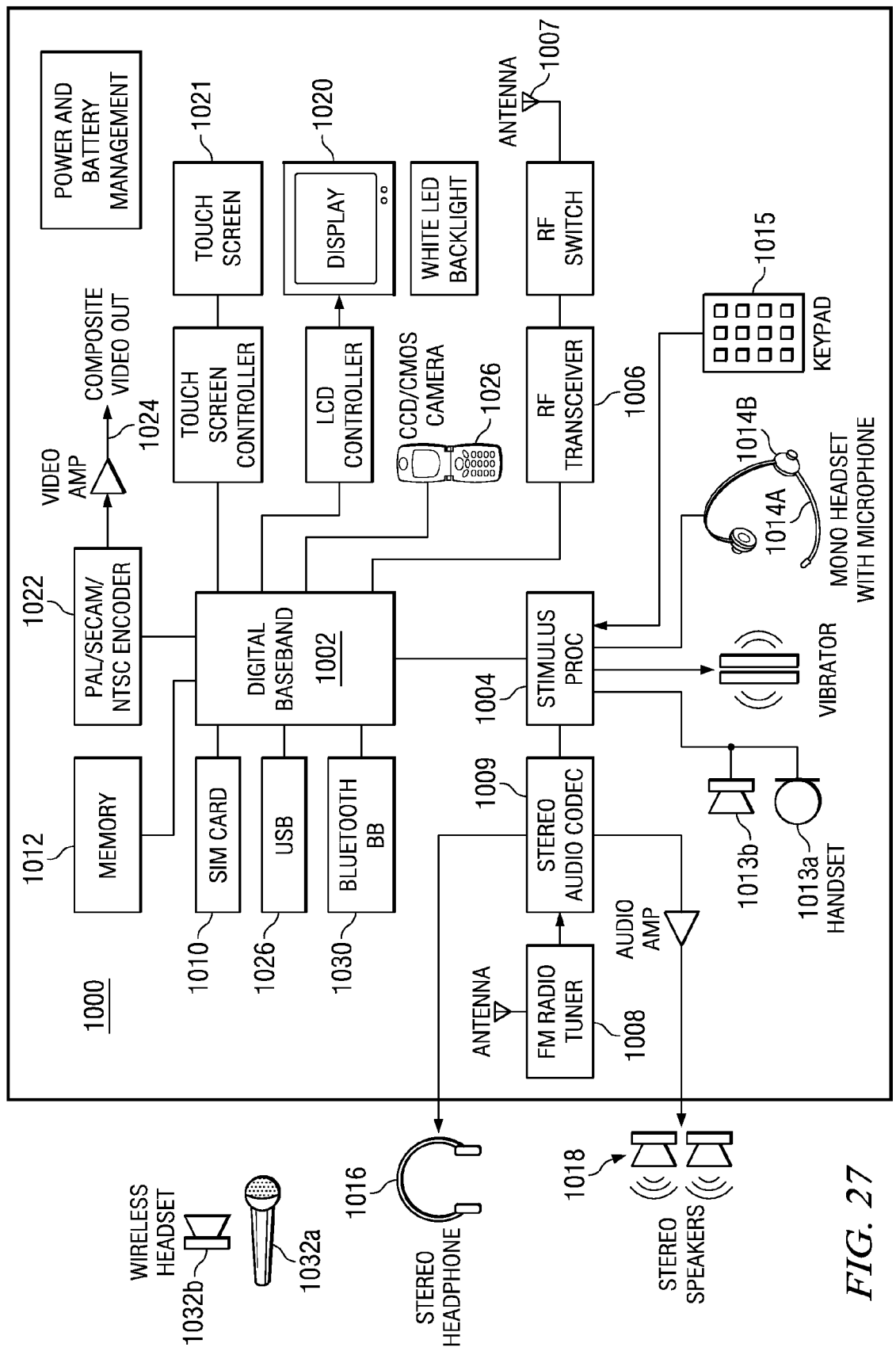
FIG. 27 is a block diagram of a cellular phone for use in the network of FIG. 1.

FIG. 27 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data packets/frames/sub-frames and commands from a cellular base station via antenna 1007 and a transmitter for transmitting a stream of coded data frames to the cellular base station via antenna 1007. Transmission of the PUCCH/PUSCH data is performed by the transceiver using the PUCCH/PUSCH resources designated by the serving eNB. In some embodiments, frequency hopping may be implied by using two or more bands. In some embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unit 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

For ACK/NAK transmission and transmission of other information elements, a transmitter(s) within transceiver 1006 (and digital baseband) may be embodied as described with respect to FIGS. 2-26. In particular, for the transmission of multiple information elements on multiple channels, production of the information elements and selection of a group of reverse link channels is performed as described above with respect to FIGS. 2-26.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

As used herein, the terms "applied," "coupled," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot. For example, block spreading codes can be assigned as described herein for transmission of data and control information, including but not limited to ACK/NAK and SRI.

In some embodiments, some or all of the various units and modules may be implemented by software executed on a local processor. In other embodiments, some or all of the various units and modules may be implemented as hardwired analog and/or digital circuitry. In this disclosure, the UL ACK/NAK and UL SRI are examples of the UL control signaling. The proposed method can also be applied to other uplink control signaling, e.g. the rank feedback information, etc.

In this disclosure, the number of UL control signaling bits (or information elements) and the number of uplink control channels are exemplary. The proposed method can be generalized to any number of information bits (or information elements), which are to be transmitted on any number of channels (i.e. resources). In certain cases, the proposed method can be applied in the downlink transmission as well. Bit mapping to physical channel mapping can be UE-specific, cell-specific, or system-specific. It is therefore contemplated that the appended claims will cover any such modifications of the embodiments as fall within the true scope and spirit of the invention.

What is claimed is:

1. A method for transmitting in a wireless communication system, comprising:

receiving an allocation of M>1 reverse link channels for transmission of N>0 information elements;

producing the N information elements;

selecting a group of K reverse link channels from the M allocated reverse link channels, using at least one of the N produced information elements, wherein the group of K reverse link channels comprises at least one channel, such that 0<K<M;

producing a signal using at least one of the N produced information elements; and transmitting the produced signal on the selected group of K reverse link channels.

2. The method of claim 1, wherein receiving an allocation of M>1 reverse link channels comprises:

receiving a signal on at least one forward link channel element (CE) indexed L1; and deriving at least a first allocated reverse link channel using the index L1.

3. The method of claim 2, wherein receiving an allocation of M>1 reverse link channels comprises:

combining an identity of a wireless node with the signal received on the forward link CE indexed L1 to produce a combined signal;

producing an error-check by performing error-detection on the combined signal; and wherein if the error-check is negative, L1 is used to derive at least the first allocated reverse link channel.

4. The method of claim 3, wherein receiving an allocation of M>1 reverse link channels further comprises:

receiving a signal on at least one forward link CE indexed L2; and deriving at least a second allocated reverse link channel using the index L2.

5. The method of claim 1, wherein receiving an allocation of M>1 reverse link channels comprises:

receiving a signal on at least a forward link channel element (CE) indexed L1 and a forward link CE indexed L2;

combining an identity of a wireless node with the received signal to produce a combined signal;

producing an error-check by performing error-detection on the combined signal; and if the error-check is negative, then L1 is used to derive at least a first allocated reverse link channel and L2 is used to derive at least a second allocated reverse link channel.

6. The method of claim 2, wherein receiving an allocation of M>1 reverse link channels further comprises receiving an allocation of a second reverse link channel.

7. The method of claim 2, wherein:

N information elements are N binary-valued quantities (N bits);

the group of K reverse link channels equals exactly one reverse-link channel (K=1);

selecting a group of K=1 reverse link channels is performed using log 2(M) bits; and producing a signal is performed using N−log 2(M) bits.

8. The method of claim 1, wherein producing the N information elements comprises:

receiving at least a first data packet; and producing first ACKNAK information by performing error detection on the received first data packet, wherein the first ACKNAK information is a first information element.

9. The method of claim 8, wherein producing the N information elements further comprises producing a scheduling request indicator (SRI), wherein a second information element is the SRI.

10. The method of claim 9, further comprising:

producing new data; and sending a positive scheduling request, wherein the SRI is a binary-valued quantity (SRI bit) which is either a positive SRI or a negative SRI.

11. The method of claim 9, wherein:

receiving an allocation of M>1 reverse link channels comprises receiving an allocation of a first reverse link channel, and receiving an allocation of a second reverse link channel;

selecting a group of K=1 reverse link channels comprises selecting the second allocated reverse link channel whenever SRI is positive, and selecting the first allocated reverse link channel whenever SRI is negative; and producing a signal comprises using the ACKNAK information element.

12. The method of claim 8, wherein producing the N information elements further comprises:

receiving a second data packet; and producing a second ACKNAK information by performing error detection on the received second data packet, wherein the second ACKNAK information is a second information element.

13. The method of claim 12, wherein the first ACKNAK information is used to select a group of K=1 reverse link channels; and wherein the second ACKNAK information is used to produce the signal.

14. The method of claim 1, wherein transmitting the produced signal lasts for a duration which is an integral multiple of 0.5 ms slots; wherein each slot comprises an integral number of symbols; wherein there are four data-bearing symbols in the slot; and wherein the number of reference symbols (RS) in the slot is selected from a set of {2,3}.

15. The method of claim 1, wherein producing a signal using at least one of the N produced information elements comprises producing a reference signal (RS) having P1 time durations; and wherein producing the reference signal for a Q-th logical time duration comprises:

producing a first sequence;

producing a second sequence; and multiplying the entire first sequence with the Q-th element of the second sequence; wherein $1 \leq Q \leq P1$.

16. The method of claim 1, wherein producing a signal using at least one of the N produced information elements further comprises producing a data-bearing signal having P2 logical time durations; and wherein producing data-bearing signal for R-th logical time duration comprises:

producing a third sequence;

producing a fourth sequence; and multiplying the entire third sequence with the R-th element of the fourth sequence; wherein $1 \leq R \leq P2$.

17. The method of claim 16, further comprising:

producing a scheduling request indicator (SRI);

producing ACKNAK information by performing error detection on a received first data packet; and wherein:

receiving an allocation of M>1 reverse link channels comprises receiving an allocation of a first reverse link channel, and receiving an allocation of a second reverse link channel;

selecting a group of K=1 reverse link channels comprises selecting the second allocated reverse link channel whenever SRI is positive, and selecting the first allocated reverse link channel whenever SRI is negative; and producing a signal comprises using the ACKNAK information element.

18. The method of claim 16, wherein producing the N information elements comprises:

receiving at least a first data packet, and producing first ACKNAK information by performing error detection on the received first data packet, wherein the first ACKNAK information is the first information element; and receiving a second data packet, and producing a second ACKNAK information by performing error detection on the received second data packet, wherein the second ACKNAK information is a second information element.

19. An apparatus for transmitting in a wireless communication system, comprising:

circuitry for receiving an allocation of M>1 reverse link channels for transmission of N>0 information elements; coupled to circuitry for producing the N information elements; coupled to circuitry for selecting a group of K reverse link channels, from the M allocated reverse link channels, using at least one of the N produced information elements; wherein the group of K reverse link channels comprises at least one channel, such that 0<K<M; coupled to circuitry for producing a signal using at least one of the N produced information elements; and coupled to circuitry for transmitting the produced signal on the selected group of K reverse link channels.

20. The apparatus of claim 19, wherein the circuitry for receiving an allocation of M>1 reverse link channels comprises:

circuitry for receiving a signal on at least one forward link channel element (CE) indexed L1; coupled to circuitry for deriving at least a first allocated reverse link channel using the index L1.

21. The apparatus of claim 20, wherein the circuitry for receiving an allocation of M>1 reverse link channels comprises:

circuitry for combining an identity of a wireless node with the signal received on the forward link CE indexed L1, to produce a combined signal; coupled to circuitry for producing an error-check by performing error-detection on the combined signal; wherein if the error-check is negative, then L1 is used to derive at least the first allocated reverse link channel.

22. The apparatus of claim 20, wherein the circuitry for producing N information elements comprises:

circuitry for receiving a data packet; coupled to circuitry for producing ACKNAK information by performing error detection on the received data packet.

23. The apparatus of claim 22, wherein the circuitry for producing N information elements comprises circuitry for producing a scheduling request indicator (SRI).

24. The apparatus of claim 23, wherein the circuitry for receiving an allocation of M>1 reverse link channels comprises:

circuitry for receiving an allocation of the first reverse link channel; and circuitry for receiving an allocation of the second reverse link channel; and wherein the circuitry for selecting a group of K=1 reverse link channels operates by selecting the second allocated reverse link channel whenever SRI is positive and selecting the first allocated reverse link channel whenever SRI is negative.

25. The apparatus claim 19, wherein:

the circuitry for producing a signal using at least one of the N produced information elements comprises circuitry for producing a reference signal (RS) comprising P1 logical time durations; and the circuitry for producing a reference signal comprises:
circuitry for producing a first sequence;
circuitry for producing a second sequence; and
circuitry for multiplying the entire first sequence with a Q-th element of the second sequence, wherein $1 \leq Q \leq P1$.

* * * * *